US010756974B2

(12) United States Patent
Malaspina et al.

(10) Patent No.: US 10,756,974 B2
(45) Date of Patent: Aug. 25, 2020

(54) LAUNCH MULTIPLE DEVICES FIRMWARE UPDATE OPERATION FROM ANOTHER APPLICATION WITH DEVICE LIST CONTEXT

(71) Applicant: Rockwell Automation Technologies, Inc., Mayfield Heights, OH (US)

(72) Inventors: Fabio Malaspina, Twinsburg, OH (US); Laura A. Pfancuff, Brecksville, OH (US); James A. Bizily, Willoughby, OH (US); Eric C. Solderitsch, Brunswick, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 115 days.

(21) Appl. No.: 15/715,528

(22) Filed: Sep. 26, 2017

(65) Prior Publication Data

US 2018/0359144 A1 Dec. 13, 2018

Related U.S. Application Data

(60) Provisional application No. 62/517,559, filed on Jun. 9, 2017.

(51) Int. Cl.

| G06F 15/16 | (2006.01) |
| H04L 12/24 | (2006.01) |
| G06F 8/65 | (2018.01) |
| H04L 29/08 | (2006.01) |
| G05B 19/418 | (2006.01) |
| G06F 8/654 | (2018.01) |

(52) U.S. Cl.
CPC ........ *H04L 41/082* (2013.01); *G05B 19/4185* (2013.01); *G06F 8/65* (2013.01); *G06F 8/654* (2018.02); *H04L 41/0843* (2013.01); *H04L 41/0886* (2013.01); *H04L 67/12* (2013.01); *H04L 67/34* (2013.01); *H04L 41/0253* (2013.01); *H04L 41/0879* (2013.01)

(58) Field of Classification Search
None
See application file for complete search history.

(56) References Cited

U.S. PATENT DOCUMENTS

| 7,933,668 B2 | 4/2011 | Braun et al. | |
| 2008/0077617 A1* | 3/2008 | Schulz | G06Q 10/06 |
| 2008/0189693 A1* | 8/2008 | Pathak | G06F 8/65 |
| | | | 717/168 |
| 2010/0131084 A1 | 5/2010 | VanCamp | |

(Continued)

*Primary Examiner* — Padma Mundur

(57) ABSTRACT

A method for updating firmware within an industrial automation environment comprising a plurality of industrial components is provided. The method includes providing an industrial system firmware update menu from an update server to a user through a web interface within an application running on a user device, and receiving one or more selections of the industrial system firmware update menu from the user through the web interface. The method also includes processing the one or more selections of the industrial system firmware update menu to determine required firmware update files and a firmware update schedule, and transferring the required firmware update files to the industrial components in an order specified by the firmware update schedule.

17 Claims, 20 Drawing Sheets

(56) References Cited

U.S. PATENT DOCUMENTS

| | | | |
|---|---|---|---|
| 2010/0131939 A1* | 5/2010 | Hieb | G06F 8/73 |
| | | | 717/169 |
| 2013/0212129 A1* | 8/2013 | Lawson | G05B 19/4185 |
| | | | 707/779 |
| 2016/0050116 A1* | 2/2016 | Sheshadri | H04L 41/0843 |
| | | | 709/221 |
| 2017/0052777 A1* | 2/2017 | Oikawa | H04L 41/082 |
| 2018/0042189 A1* | 2/2018 | Klein | A01G 25/162 |

* cited by examiner

LAUNCH MULTIPLE DEVICES FIRMWARE UPDATE OPERATION FROM ANOTHER APPLICATION WITH DEVICE LIST CONTEXT

TECHNICAL BACKGROUND

This application hereby claims the benefit of and priority to U.S. Provisional Patent Application No. 62/517,559, titled "LAUNCH MULTIPLE DEVICES FLASHING OPERATION FROM ANOTHER APPLICATION WITH DEVICE LIST CONTEXT", filed on Jun. 9, 2017 and which is hereby incorporated by reference in its entirety.

TECHNICAL BACKGROUND

Industrial automation is used to control machines and processes in manufacturing. Automated machines commonly control the handling of components, sub-components, and raw materials, perform fabrication processes, testing, product handling, packaging, and shipping. Industrial automation enables precise control of industrial processes, achievement of smaller tolerances and higher quality products, higher production outputs, and increased worker safety and productivity.

Industrial automation environments comprise multiple computerized devices that control industrial machines and industrial processes. The components of an industrial automation environment must work together in a coordinated fashion, performing operations such as exchanging data, controlling the timing and scheduling of processes, providing information to operators or technicians, and receiving operator inputs.

Industrial automation environments commonly include hundreds of machines and other components. Cross-compatibility requirements, the need for system and device instances consistency, and application validation requirements often require users to set large numbers of devices to known firmware revisions. The operation of setting up all of the devices to a known firmware revision is very time consuming. This operation often requires multiple people spending large amounts of time to accomplish the task.

Overview

In an embodiment, a method for updating firmware within an industrial automation environment comprising a plurality of industrial components is provided. The method includes providing an industrial system firmware update menu from an update server to a user through a web interface within an application running on a user device, and receiving one or more selections of the industrial system firmware update menu from the user through the web interface.

The method also includes processing the one or more selections of the industrial system firmware update menu to determine required firmware update files and a firmware update schedule, and transferring the required firmware update files to the industrial components in an order specified by the firmware update schedule.

In another embodiment, one or more non-transitory computer-readable media having stored thereon program instructions to facilitate updating firmware within an industrial automation environment comprising a plurality of industrial components are provided. The program instructions, when executed by a computing system, direct the computing system to at least provide an industrial system firmware update menu from an update server to a user through a web interface within an application running on a user device, and to receive one or more selections of the industrial system firmware update menu from the user through the web interface.

The program instructions further direct the computing system to at least process the configuration template and available firmware updates to process the one or more selections of the industrial system firmware update menu to determine required firmware update files and a firmware update schedule, and to transfer the required firmware update files to the industrial components in an order specified by the firmware update schedule.

In a further embodiment, a computer system for updating firmware within an industrial automation environment comprising a plurality of industrial components is provided. The computer system comprises a machine interface coupled with the plurality of industrial components, configured to transfer firmware updates to the plurality of industrial components, a user interface configured to receive inputs from a user, and to display information to the user, a hardware memory storing data corresponding to the industrial automation environment, and a processor coupled with the machine interface, the user interface, and the hardware memory.

The processor is configured to provide an industrial system firmware update menu from an update server to a user through a web interface within an application running on a user device, and to receive one or more selections of the industrial system firmware update menu from the user through the web interface.

The processor is also configured to process the one or more selections of the industrial system firmware update menu to determine required firmware update files and a firmware update schedule, and to transfer the required firmware update files to the industrial components in an order specified by the firmware update schedule.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

Figure 1:
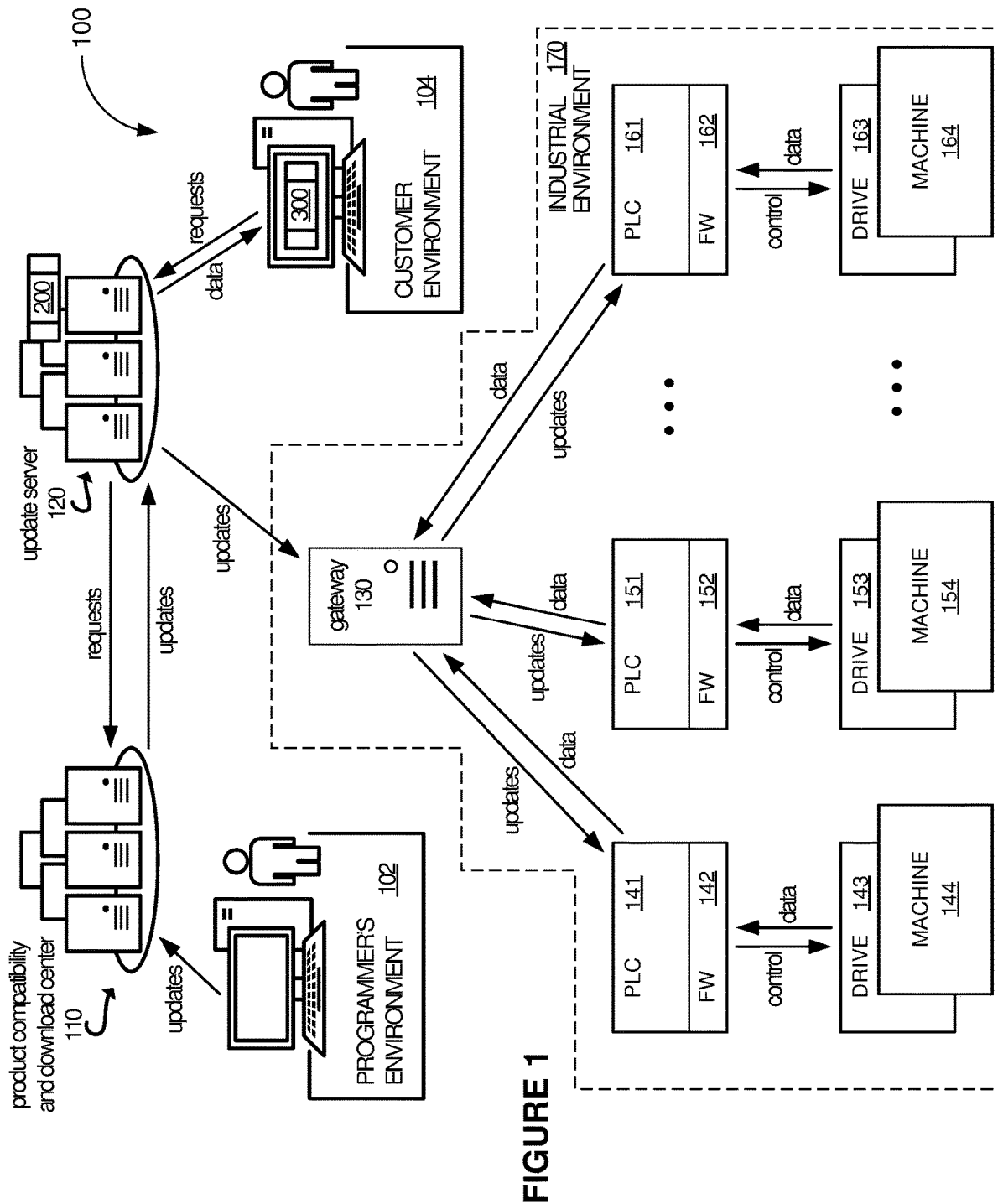
FIG. 1 illustrates an exemplary industrial automation system including an update server for managing firmware updates.

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

The number of devices in an automation system has gone way up, with some machines including hundreds of devices. Cross compatibility requirements, need for system and device instances consistency, application validation requirements require customers to set large numbers of devices to known revisions. The operation of setting up all of the hardware products to a known firmware revision is very time-consuming. This operation currently requires multiple people spending multiple hours for it to be accomplished.

Applying consistent hardware, software and firmware revisions across so many devices can be very time consuming and error prone. Whether a new industrial application is being specified, developed, maintained or upgraded, being able to easily and repeatably set its components to known standards is of great value.

This invention provides the ability to launch multiple devices updating firmware one task in one operation, by one person using a graphical interface. It also takes care of determining the order as to how devices need to be updated to avoid conflicts.

It includes an application with a graphical user interface for allowing users to launch a multi device firmware upgrading operation, which includes devices catalog numbers, firmware revisions, addresses and path. It also includes the ability to coordinate the order on how devices should be firmware updated, and the ability to initiate the multi-firmware update operation silently, and to initiate a multi-firmware update operation when called from another application.

Providing the ability to update devices' firmware is a basic capability that many have. However, this is an extension that allows users to set multiple devices firmware updates from an easy-to-use graphical interface. The tool also has built-in strategies to update modules in the correct order.

Previously, a user would have to manually update one device at a time via a graphical interface or create a script file, which is a very time consuming, inefficient, error prone method. The user needed to define the devices' updating order by trial and error, which was time consuming.

The invention described herein provides more flexibility by allowing for other platforms, mobile and cloud, to be used to firmware update devices. The invention will allow customers to remotely firmware update devices through a mobile app, a web app running on a mobile device, a web page, or a web browser. The actual firmware kits and update engine will be hosted and run on a on-premise gateway or the cloud.

The invention may include a web application and related services running on the cloud for firmware updating industrial automation devices connected to an on-premise gateway, or a mobile application and related services for firmware updating industrial automation devices connected to an on-premise gateway.

The invention also may include a web application and related services running on the cloud for streaming firmware updating industrial automation devices via an on-premise gateway, or a mobile application and related services for streaming firmware updating industrial automation devices connected via an on-premise gateway.

The invention provides the ability to make devices' firmware updates from a mobile application and cloud application, the ability to stream firmware updates from a central repository on the cloud, the ability to be notified of updates inline from the mobile application and cloud application, and the ability to integrate the mobile application and cloud application with a download center.

In order to reduce risk, get repeatable performance and improve product lifecycle, users standardize on certain sets of industrial automation products and their revisions. This invention allows customers to easily define, name, persist and share groups of hardware and firmware revisions combinations in templates that can be applied to devices during the entire lifecycle of an industrial automation system.

The invention allows users to create named templates of hardware and firmware revisions for a new industrial automation system. Templates can be then applied to a new machine design application, to a firmware upgrade operation, and other similar type operations, where sets of specific versions need to be applied to a group of devices. Templates can be created by machine, plant, company. Templates can be imported and exported for easy sharing with others.

In another embodiment, the invention allows users to create named templates of firmware revisions for select hardware modules. Templates can then be applied to a firmware update operation. Templates can be created by machine, plant, company. Templates can be imported and exported for easy sharing with others.

In further embodiments, the invention may include a user interface allowing customers to create templates of hardware types and relative firmware revisions, allowing customers to apply these templates of firmware revisions to devices in an application, and providing the ability to import and export templates for sharing with others.

The invention greatly simplifies the application of firmware standards to industrial applications, whether on a machine, plant, or enterprise level. It could be applied to many products.

Previously this process required many manual steps by customers, which cannot be reused and can negatively impact productivity and generate unintended shutdowns.

When an OEM needs to start-up a machine or an end-user needs to update an existing machine, they must first determine current devices revisions and identify any new firmware revisions that may be available, what changes they may include, evaluate system compatibility requirements, review latest hardware lifecycle, review potential product service advisories (PSAs), then download the missing firmware. These are all keyboard intensive, time-consuming, multi-step, manual operations that require the user using multiple systems/applications.

All of the products' lifecycle and compatibility data exists on the product compatibility and download center web site. This data is updated in real-time.

The invention described here will aid customers in locating and acquiring firmware kits from the product compatibility and download center if not available on the users' computer or other device and verify system compatibility. It will also allow them to review firmware release notes and other related information (lifecycle, PSA, tech notes, etc.) without ever leaving their application.

The invention comprises a web service that allows for client applications to access the product compatibility and download center as a data server.

The invention may include a web service or interface for allowing client applications connection to an external database for real-time access to industrial automation products lifecycle data. The client application may use the data to provide system compatibility verification. The client application can initiate artifacts (firmware, release notes, etc.) downloads through the web service. The application can acquire products' lifecycle status.

Web services are used together in industrial automation non-web based applications to provide this level of data products lifecycle data integration. All industrial automation vendors have a need to make managing the lifecycle for customers easier and we have an opportunity to be the first ones to provide this capability.

Previously, customers needed to go to the web and manually research products' lifecycle changes, whether new firmware releases, enter large number of product information to validate compatibility, read release notes, search for PSAs, etc. The user needed to enter the same information in multiple applications. The user needed to manually look for updates.

When an OEM needs to start-up a machine or an end-user needs to update an existing machine, they must first determine whether the device's revisions are compatible with each other, which is an intensive, time-consuming, multi-step, manual operation that requires the user to access the product compatibility and download center, read release notes, etc. This compatibility check is not integrated in existing applications.

All of the product's lifecycle and compatibility data exists on the product compatibility and download center web site. This data is updated in real-time. The invention described here will aid customers in verifying that the products/firmware combinations used in an automation system are compatible with each other. The application will be able to query the product compatibility site and request compatibility data for a user selected set of products/revisions configurations. The data server will return the data to the client and it will present the results to the user, without their having had to leave the application.

The invention may include a web service or interface that allows client applications connection to an external database for real-time access to industrial automation compatibility data. The client application may use the data to provide system compatibility verification. The client application may use the data to provide system compatibility recommendations.

Web services may be used together in industrial automation non-web based applications to provide this level of products compatibility information. All industrial automation vendors have a need to help customers managing products versions compatibility and we have an opportunity to be the first ones to provide this capability.

Previously, customers needed to go to the web and manually enter a large number of product information to validate compatibility. Users needed to enter the same information in multiple applications. Users needed to manually look for updates.

This invention also provides the ability to launch firmware updating software from another application, using data from said application to create the list of devices, their target revisions and communication paths. An aspect of the invention is the automatic and creation of the updateable devices list w/o the user having to manually re-enter this information. No integrated solution exists today to this problem.

The invention may include an interface that allows client applications to launch a firmware upgrading application with context, which includes the list of devices catalog numbers, firmware revisions, addresses, and paths. The invention may also include the ability to initiate the firmware update operation silently. The invention may further include the ability to report firmware update operation results from the launching application. This would provide a unique level of integration for this type of device lifecycle management operation.

Previously, the user would have to manually re-enter information from one application to another. This is time intensive and can be error prone.

FIG. 1 shows an exemplary industrial automation system 100 including an update server 120 for managing firmware updates. Industrial automation system 100 includes, programmers' environment 102, product compatibility and download center 110, update server 120, customer environment 104, gateway 130, and a plurality of industrial components within industrial automation environment 170.

In this example, each industrial component includes a machine, a drive, and a programmable logic controller that further includes firmware. The plurality of industrial components is represented in FIG. 1 by programmable logic controllers 141, 151, and 161 including firmware 142, 152, and 162, respectively, and by machines 144, 154, and 164 with corresponding drives 143, 153, and 163.

While this example illustrates a system including a single industrial automation environment 170, other examples may include multiple industrial automation environments which may by distributed in a plurality of geographic locations.

In this example, each programmable logic controller contains firmware that configures it to control its corresponding drive, which then directly operates its corresponding machine. As bugs are found and improvements are made, the firmware needs to be updated to take advantage of the fixes and improvements. However, in very complex systems, for a variety of reasons, it may be desired to have some controllers running previous versions of firmware other than the latest version. For example, interoperability issues may unexpectedly arise when the firmware for some controllers includes commands that other controllers do not yet recognize. Further, in some embodiments, firmware updates may need to be applied to various controllers in a specific order to prevent conflicts as the controllers are updated.

Currently, an engineer needs to understand all of these firmware update constraints and to manually update each controller to the correct version of firmware in the correct order. This often leads to many mistakes.

In this example, when a programmer creates a new firmware update they use programmer's environment 102 to transfer the update to product compatibility and download center 110. Product compatibility and download center 110 stores all of the various versions of firmware updates for each possible controller within an industrial automation environment.

A customer wishing to update firmware with an industrial automation environment accesses update server 120 through customer environment 104. Update server 120 includes context information for each of the industrial components within the industrial automation environment. The customer is able to create templates for storage on update server 120 that assist update server 120 in determining which versions of firmware updates need to be applied to each industrial component.

For example, the customer may create a template instructing update server 120 that PLC 151 must be updated sometime prior to PLC 141. Update server 120 stores this template, and uses it in all future updates to ensure that this update order requirement is met. As another example, the customer may create a template instructing update server 120 to never update the firmware for PLC 161. Further examples include, templates specifying a specific version of firmware to update to one or more PLCs, templates specifying that one or more PLCs always receives a firmware update two revisions earlier than the latest update (i.e., a firmware version offset), templates specifying that a PLC receives a firmware update one revision earlier than the firmware update that a different PLC receives (i.e., a relative firmware version offset), and the like.

When a customer uses customer environment 104 to update the industrial components within an industrial automation environment, update server 120 processes context data for the industrial automation environment (e.g., a schematic of how the machines and controllers are connected to each other), any available templates (selected by the engineer) available for the industrial automation environment, and a catalog of all of the available firmware updates contained within product compatibility and download center 112.

By processing all of this information, update server 120 is able to create a firmware update schedule for each industrial component specifying the version of firmware to be sent to each controller, and the order in which the firmware is to be installed on each controller. Once the engineer approves the firmware update schedule, a single operation is started within the update server to push firmware updates through gateway 130 to each controller within each industrial device.

Note that in other examples, industrial devices may include any number and combination of machines, drives, and controllers. FIG. 1 is a simplified example for purposes of clarity in understanding this method.

Figure 2:
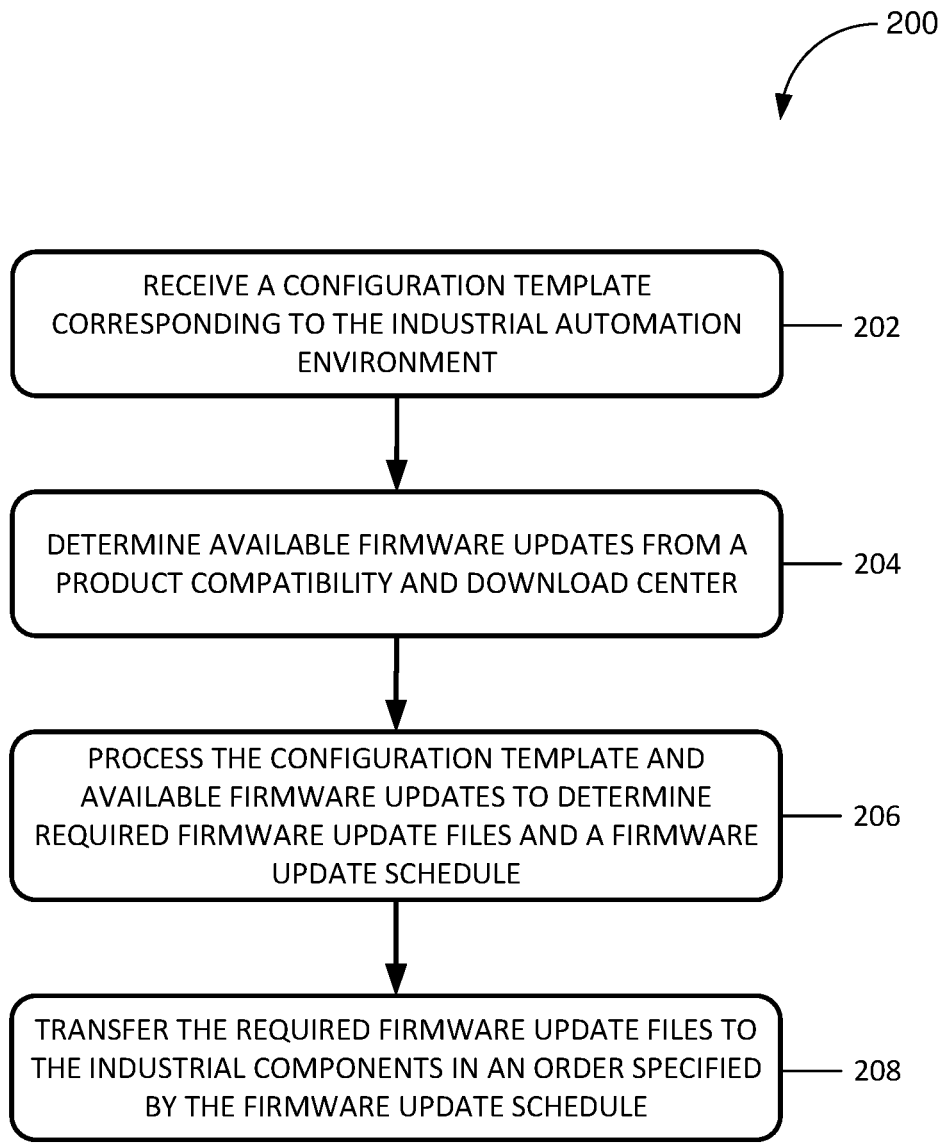
FIG. 2 illustrates an exemplary flowchart of an update process for updating firmware within an industrial automation environment.

FIG. 2 illustrates an exemplary flowchart of an update process 200 for updating firmware within an industrial automation environment comprising a plurality of industrial components, such as industrial automation system 100 from FIG. 1. In this example, industrial automation environment 170 includes gateway 130 coupled with the plurality of industrial components, configured to communicate with the plurality of industrial components and update server 120.

In this example update process 200, update server 120 receives a configuration template corresponding to the industrial automation environment 170 through a user interface from a device such as customer environment 104, (operation 202). Update server 120 determines all available firmware updates for industrial automation environment 170 on product compatibility and download center 110, (operation 204).

Update server 120 processes the configuration template and the list of available firmware updates to determine required firmware update files for industrial automation environment 170, along with a firmware update schedule, (operation 206). Update server 120 then transfers the required update files to the industrial components via gateway 130 in an order specified by the firmware update schedule, (operation 208).

Figure 3:
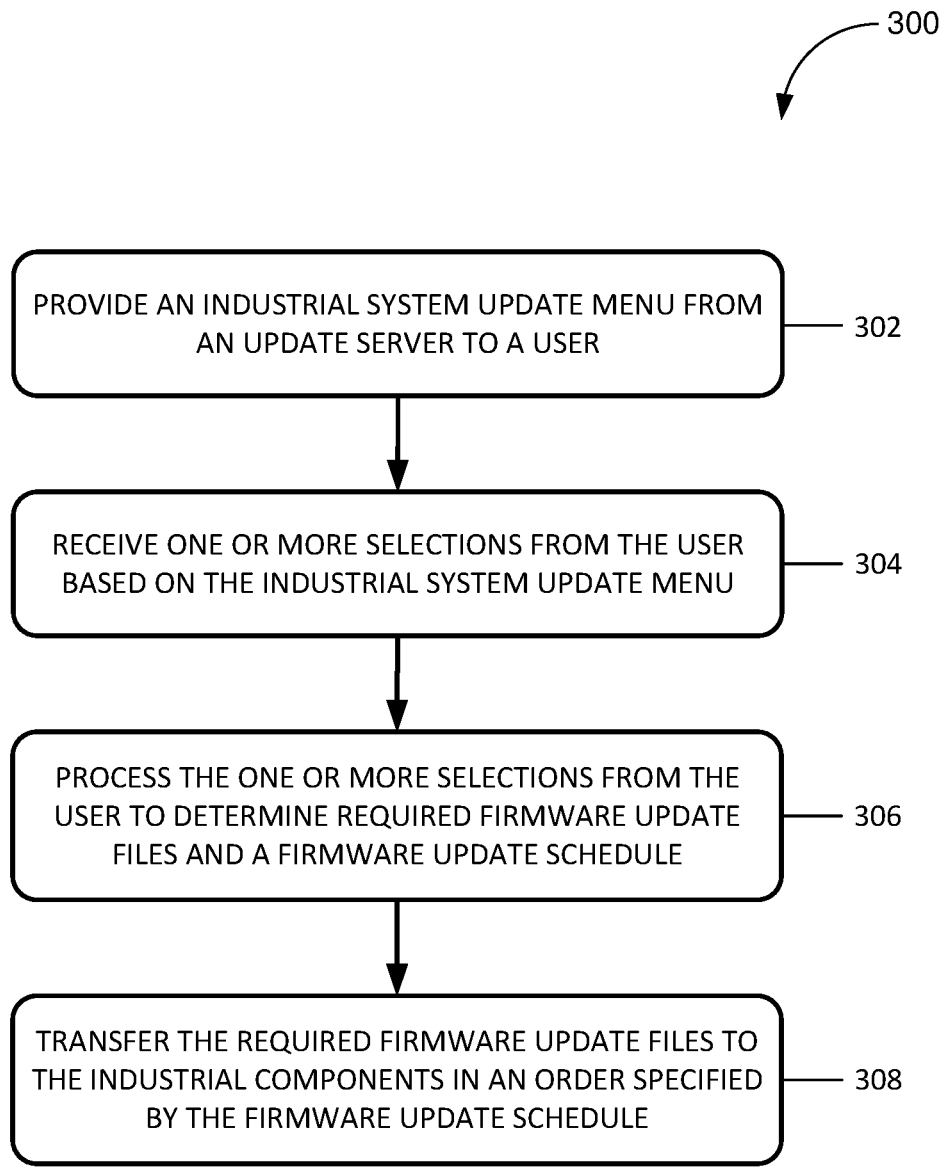
FIG. 3 illustrates an exemplary flowchart of an update process for updating firmware within an industrial automation environment.

FIG. 3 illustrates an exemplary flowchart of an update process 300 for updating firmware within an industrial automation environment comprising a plurality of industrial components, such as industrial automation system 100 from FIG. 1.

In this example, an application (update process 300) including a web interface is running on customer environment 104. The application provides an industrial system firmware update menu from an update server to a user (customer) through a web interface within an application running on a user device (customer environment 104), (operation 302). The application then receives one or more selections off of the industrial system firmware update menu from the user through the web interface, (operation 304).

The application processes the one or more selections of the industrial system firmware update menu to determine required firmware update files from product compatibility and download center 110, and a firmware update schedule, (operation 306). The application then transfers the required firmware update files to the industrial components in an order specified by the firmware update schedule through gateway 130, (operation 308). Note that the application itself may not directly receive and transfer all of the firmware updates, but instead the updates may be transferred to gateway 130 from product compatibility and download center 110 through update server 120.

FIGS. 4A-4G, 5A-5C, 6A-6C, and 7A-7C illustrate an exemplary user interface configured to assist a user in performing update processes as described above. In this example, the overall user interface is titled "ControlFLASH Plus" and includes three main views. The Flash Devices tab includes a user interface allowing the user to select which devices to update and which versions of firmware to update to the devices. This view is illustrated in FIGS. 4A-4G and described in detail below.

Figure 5A:
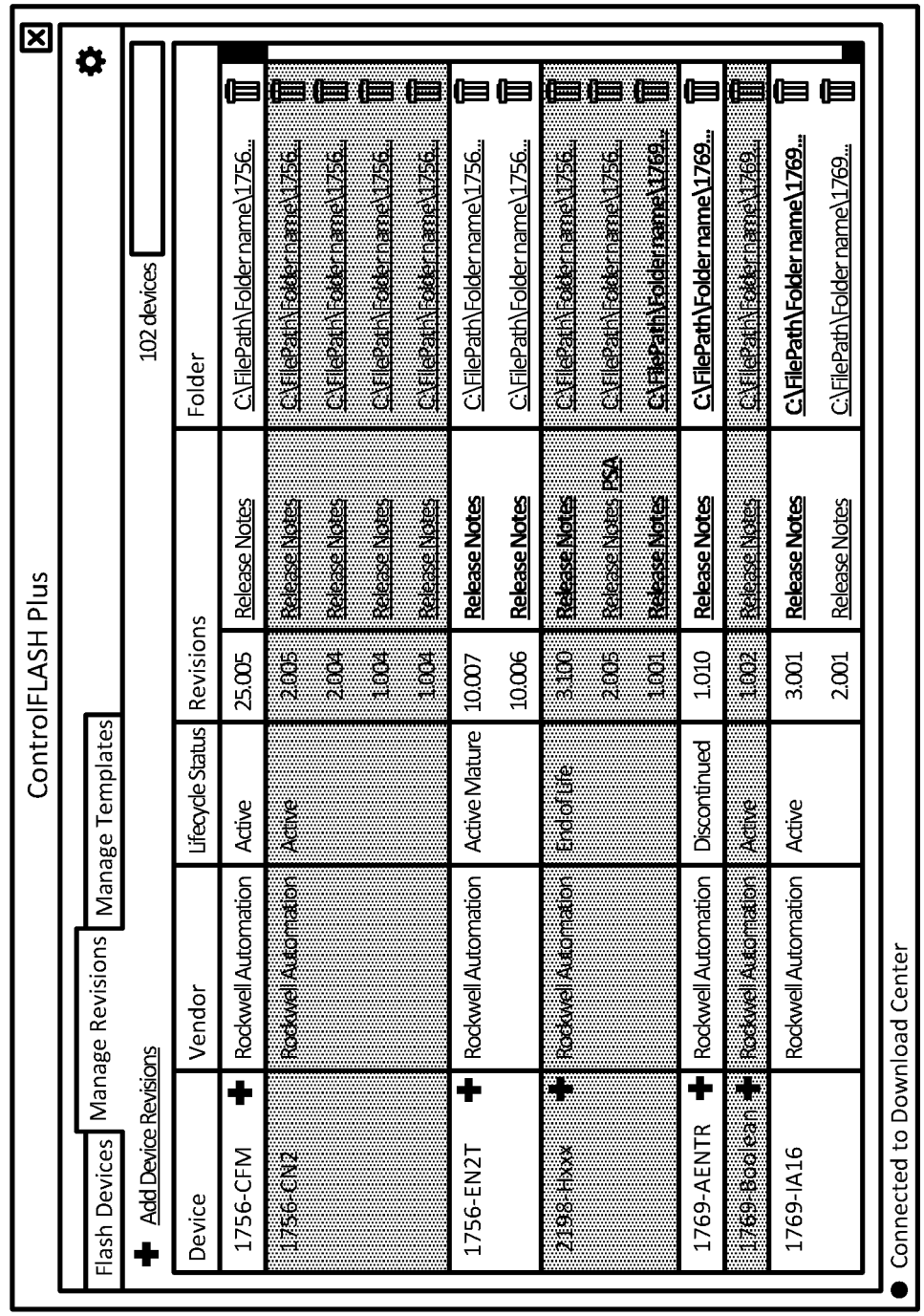
FIGS. 5A-5C illustrate an exemplary user interface for managing revisions within an update process for updating firmware within an industrial automation environment.
Figure 5B:
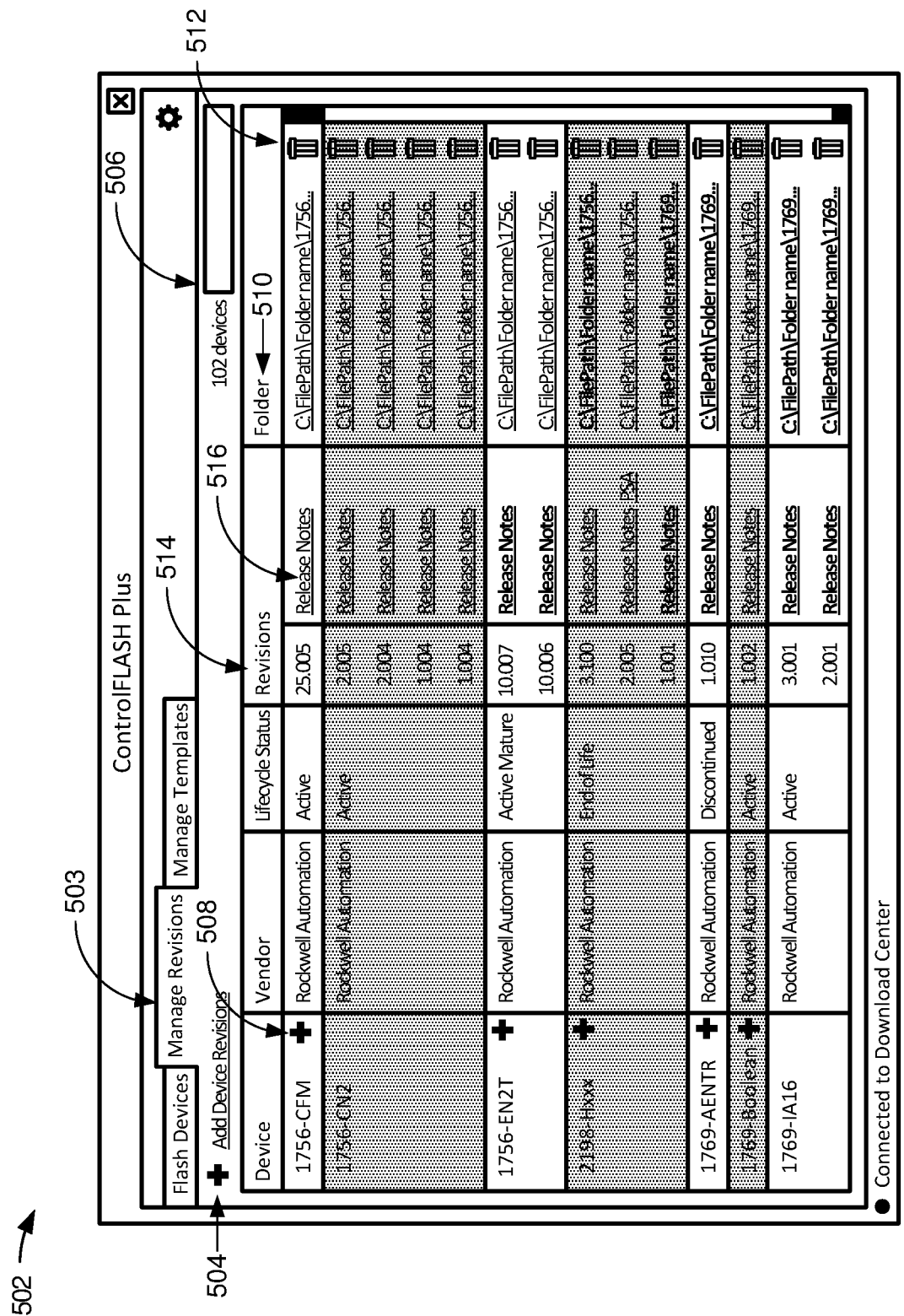
Figure 5C:
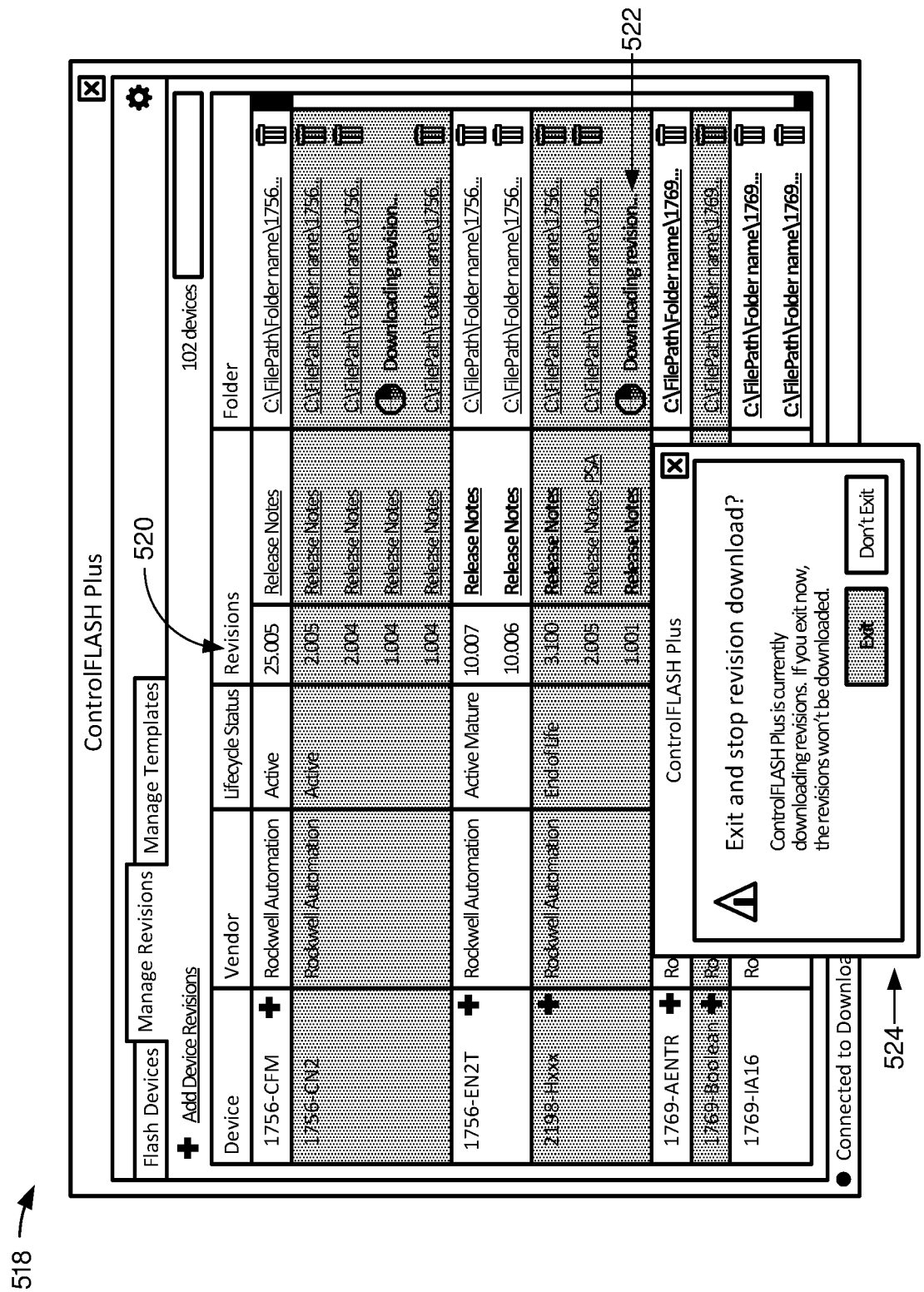
Figure 6A:
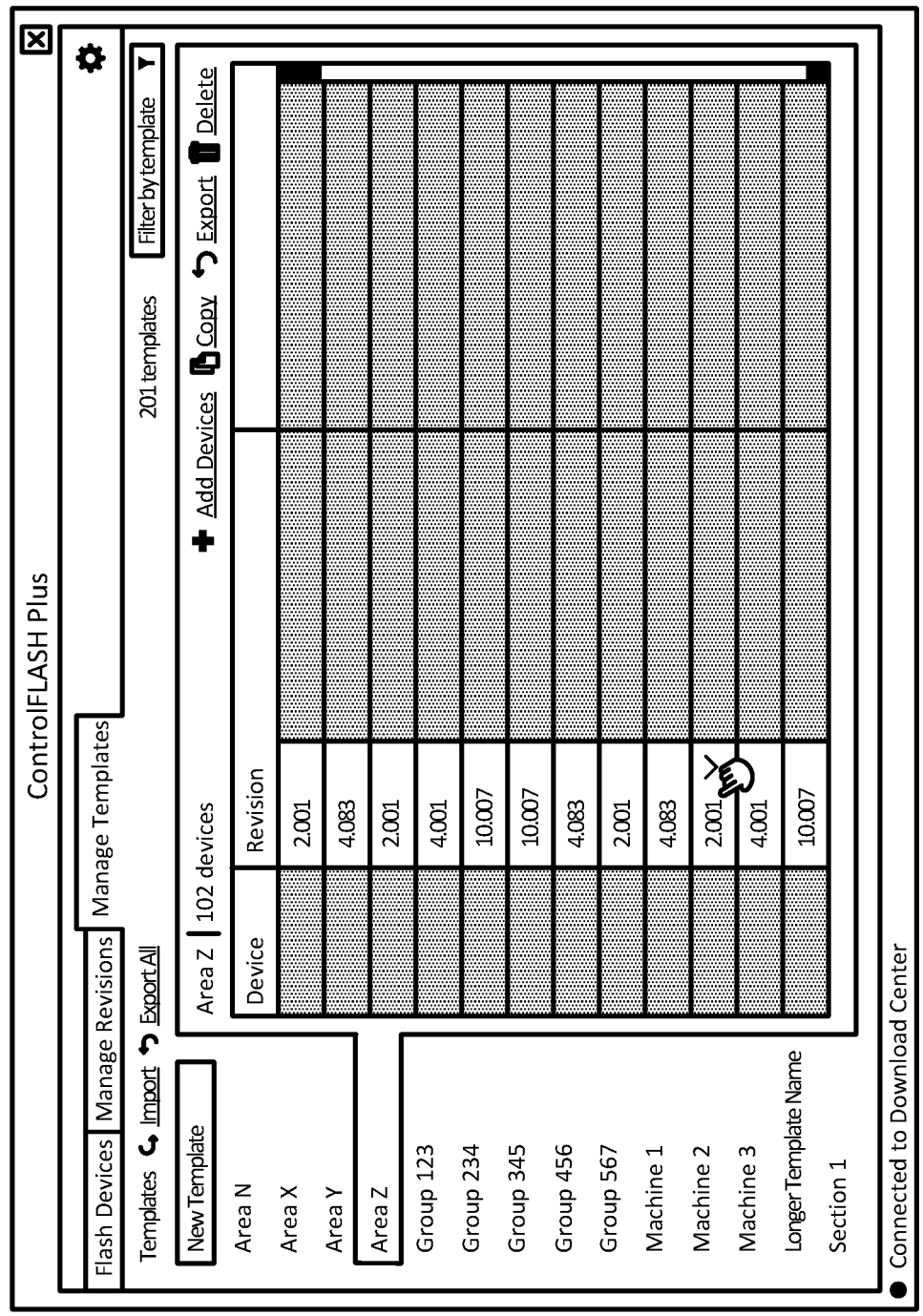
FIGS. 6A-6C illustrate an exemplary user interface for managing templates within an update process for updating firmware within an industrial automation environment.
Figure 6B:
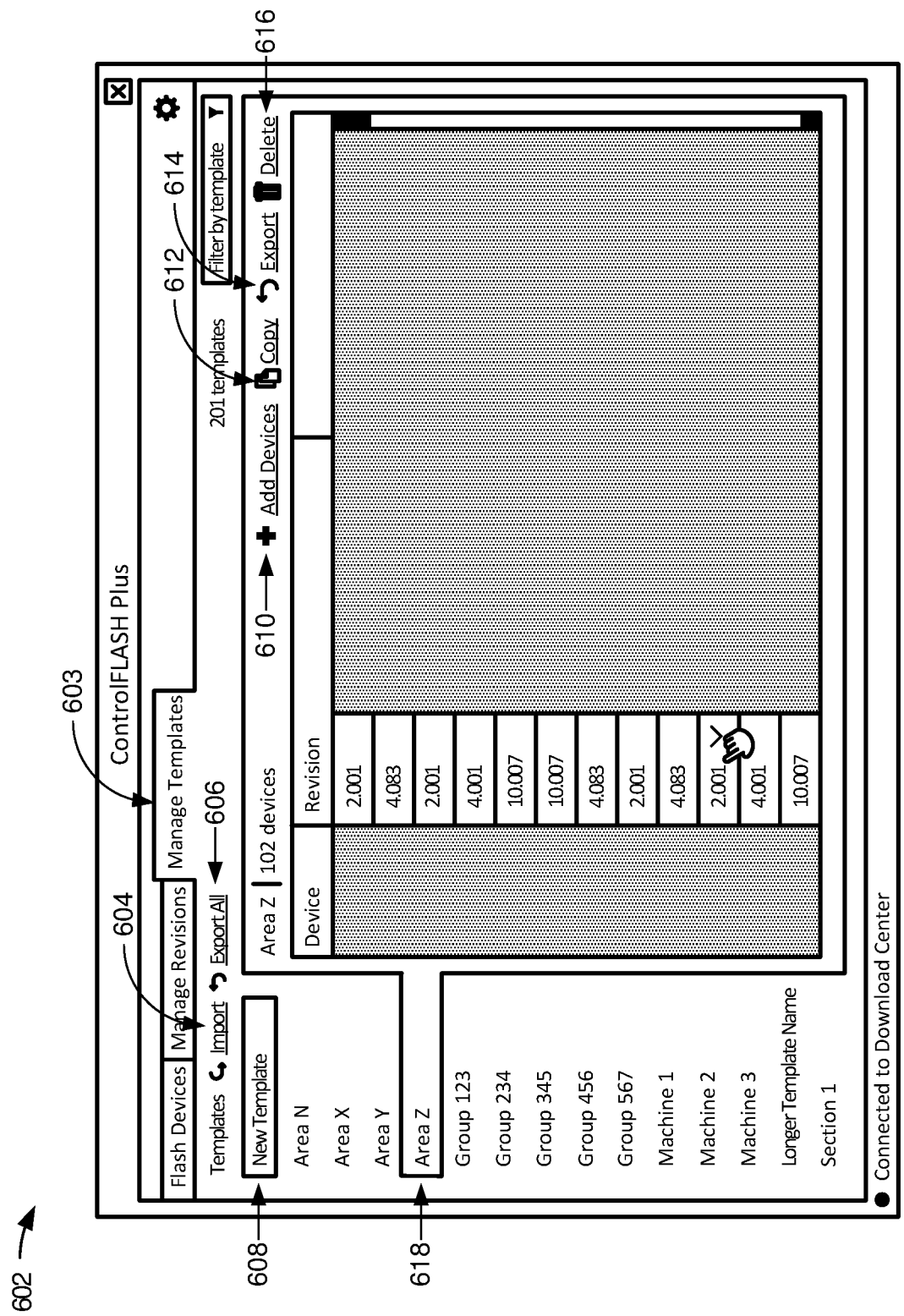
Figure 6C:
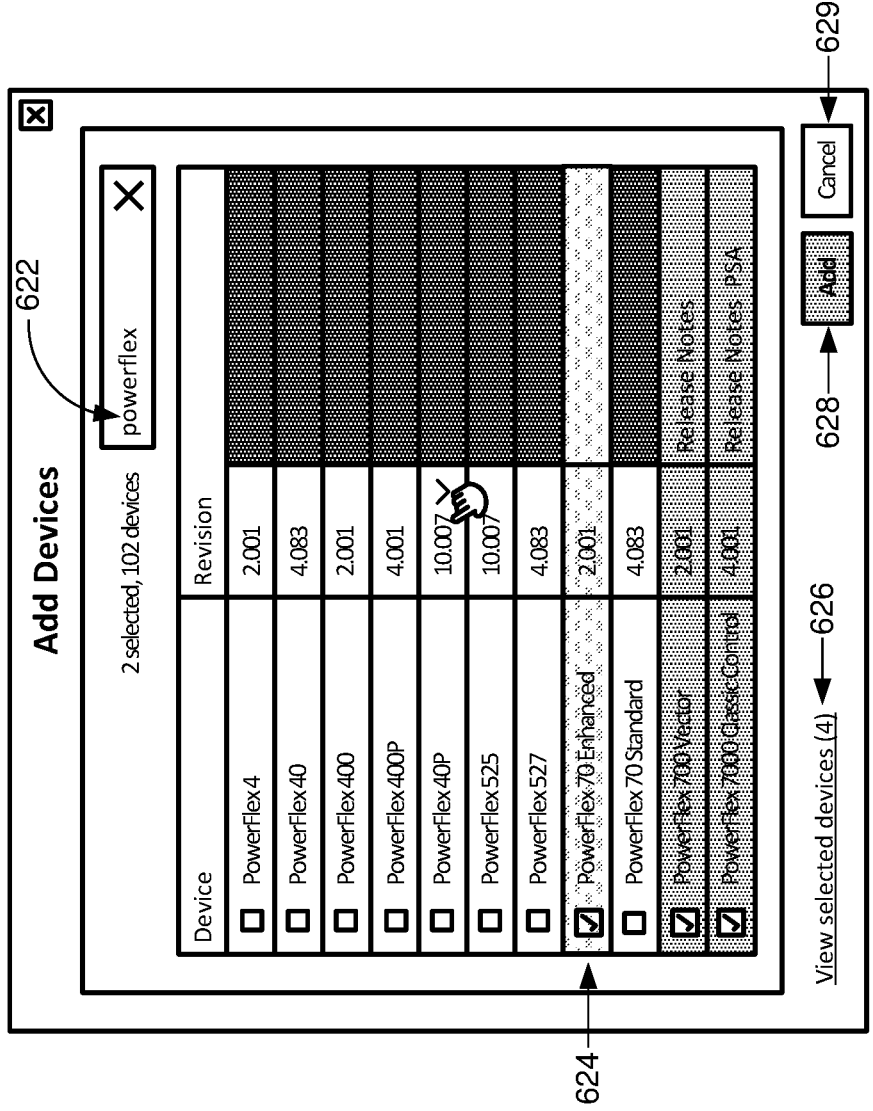

The Manage Revisions tab includes a user interface allowing the user to manage different firmware revisions for each of the devices. This view is illustrated in FIGS. 5A-5C and described in detail below. The Manage Templates tab includes a user interface allowing the user to create, modify, and manage templates used in updating firmware for the devices. This view is illustrated in FIGS. 6A-6C and described in detail below. Note that in some embodiments of the invention, these tabs and views may be referred to by different names. For example, in some embodiments "templates" are referred to as "favorites" while other embodiments may use still different terms all within the scope of the present invention.

Figure 7A:
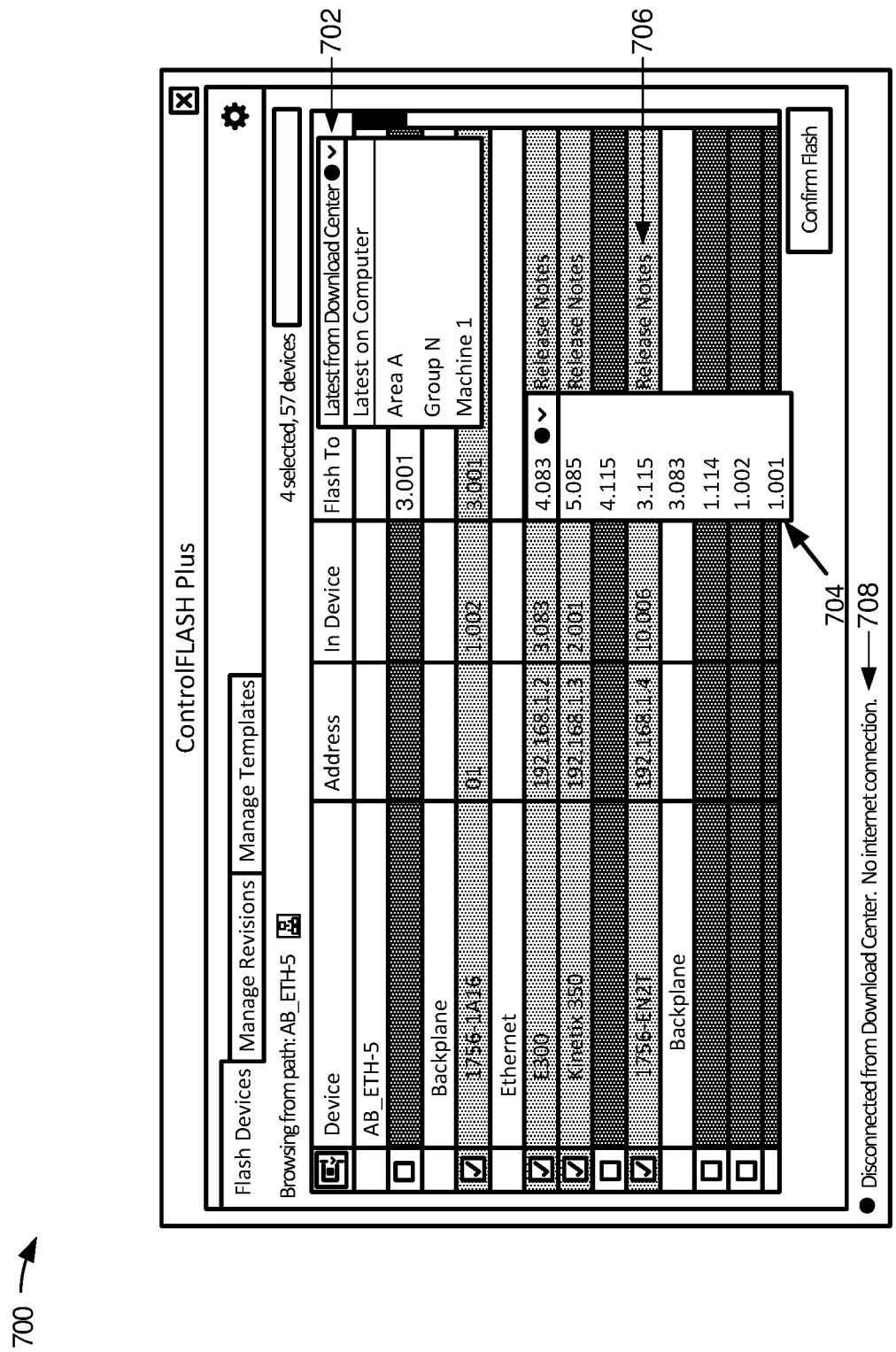
FIGS. 7A-7C illustrate an exemplary user interface for an update process for updating firmware within an industrial automation environment, when a connection to a download center is lost.
Figure 7B:
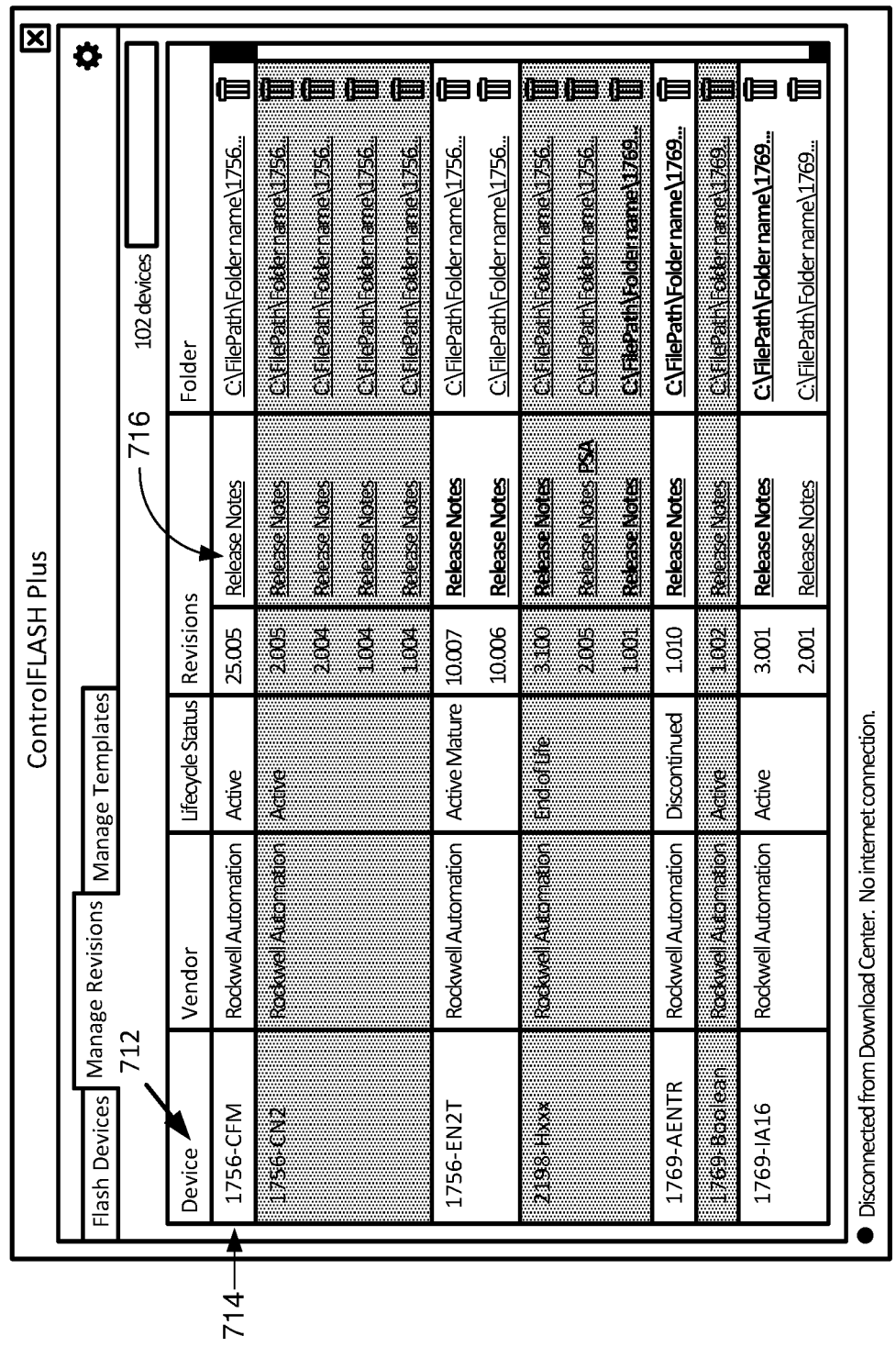
Figure 7C:
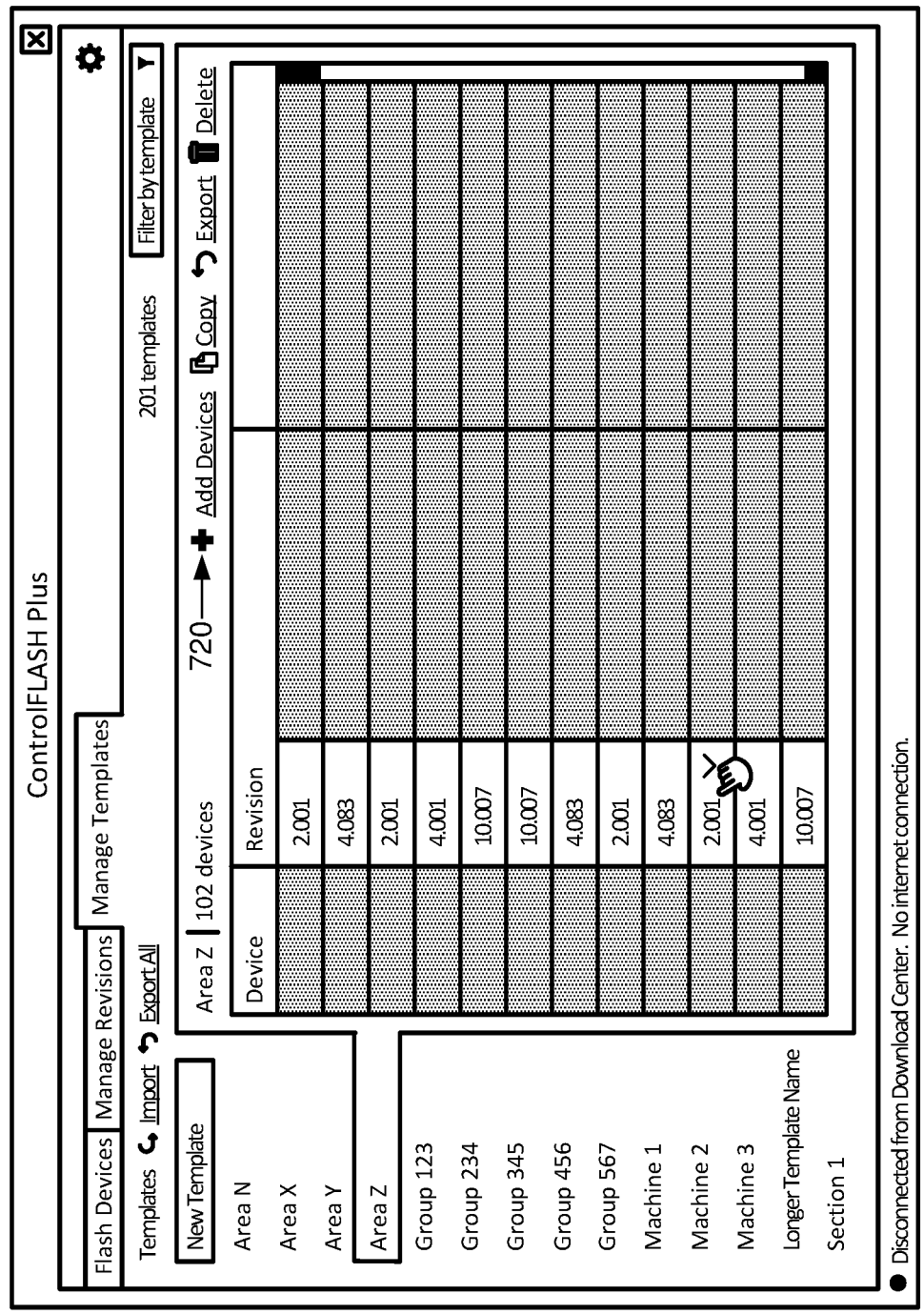

When the connection to the product compatibility and download center 110 is lost, the user interface is modified to inform the user of this break, and to assist the user in performing local operations without the availability of the product compatibility and download center 110. These views are illustrated in FIGS. 7A-7C and described in detail below.

Figure 4A:
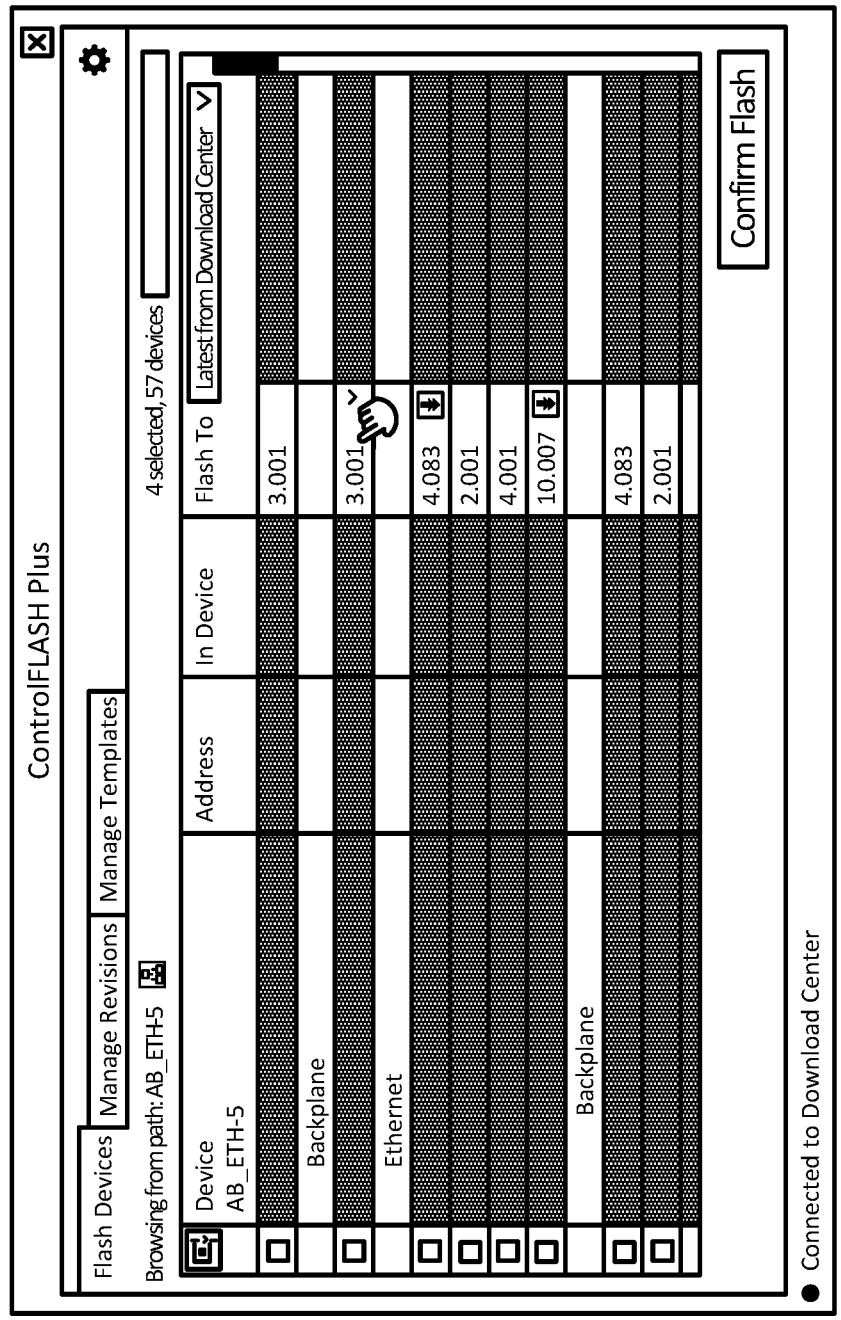
FIGS. 4A-4G illustrate an exemplary user interface for an update process for updating firmware within an industrial automation environment.

FIGS. 4A-4G illustrate an exemplary user interface for an update process for updating firmware within an industrial automation environment. FIG. 4A illustrates an exemplary user interface 400 titled "ControlFLASH Plus: Flash Devices" which is configured to update machine firmware within an industrial automation environment comprising a plurality of industrial components, such as industrial automation system 100 from FIG. 1.

Figure 4B:
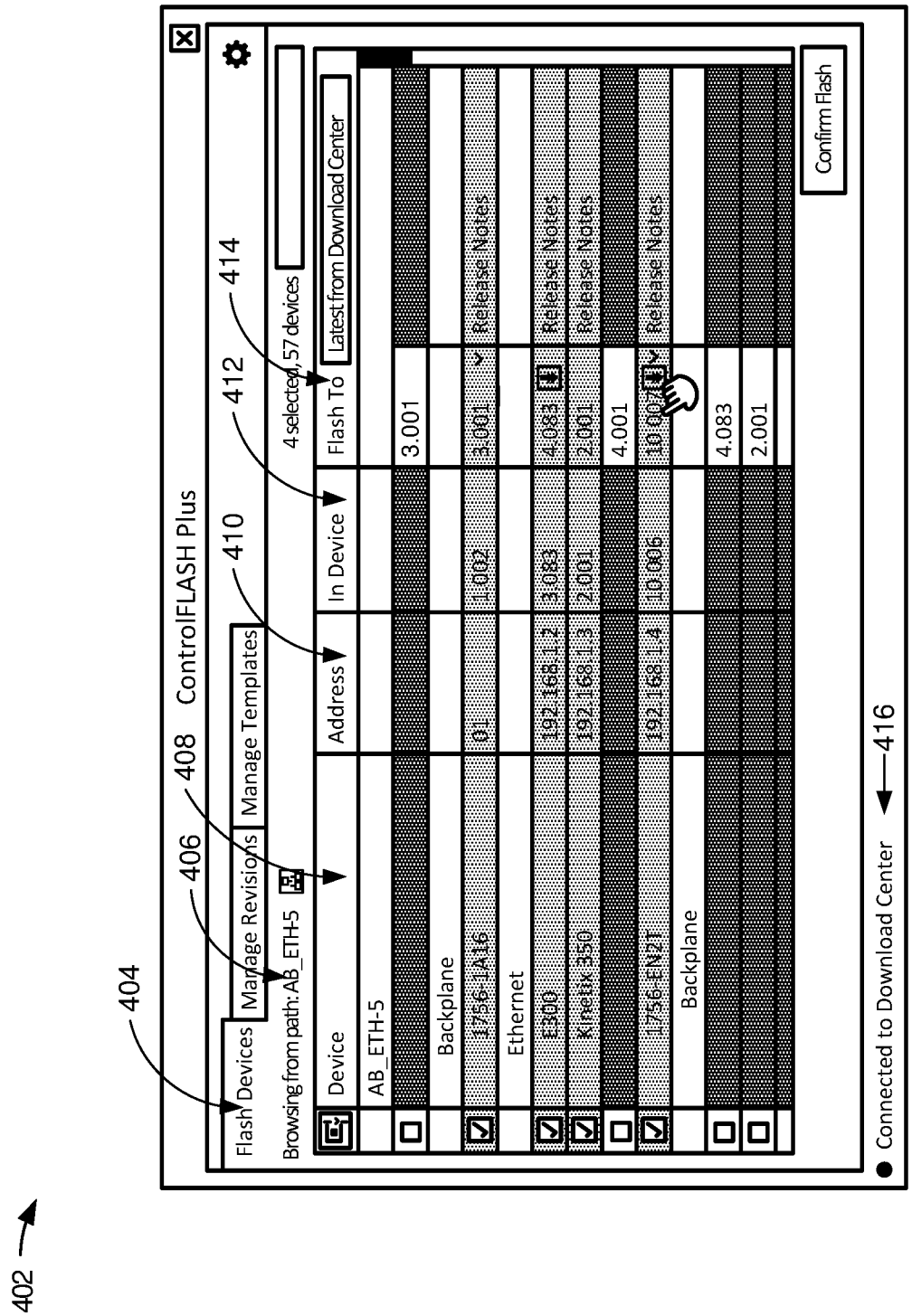

FIG. 4B illustrates additional aspects of an exemplary user interface 402 titled "ControlFLASH Plus: Flash Devices" which is configured to update machine firmware within an industrial automation environment comprising a plurality of industrial components, such as industrial automation system 100 from FIG. 1.

Flash Devices 404 is the default tab. When the application is launched for the first time on a computer, the browsing path 406 defaults to the highest network node in the topology. Network nodes consist of network buses, such as Ethernet, DeviceNet, and ControNet, as well as RS Linx drivers and USB drivers. Subsequently, the browsing path defaults to the last selected path in the previous session. Clicking the RS Linx button launches the RS Linx Evolution browser. The device column 408 displays the topology dictated by the selected browsing path. The name displayed is that returned by the device. Each name is indented appropriately to indicate hierarchy. Network and chassis node names are displayed in a lighter font in the device column, and there's no information shown in the other columns.

The node address of each device is shown in the Address column 410. For devices located in a chassis, the slot number is displayed. The In Device column 412 indicates the firmware revision currently in the device, as retrieved from the device.

The Flash To column 414 contains a revision dropdown for each device, as well as a link to the release notes spanning from the In Device revision to the selected Flash To revision. Links to any product service advisories (PSAs) will also be displayed. HTML format will be used to display documents. The operating system will determine which program should be used. Saving is handled by that program. Indicator 416 indicates a connection to the product compatibility and download center 110.

Figure 4C:
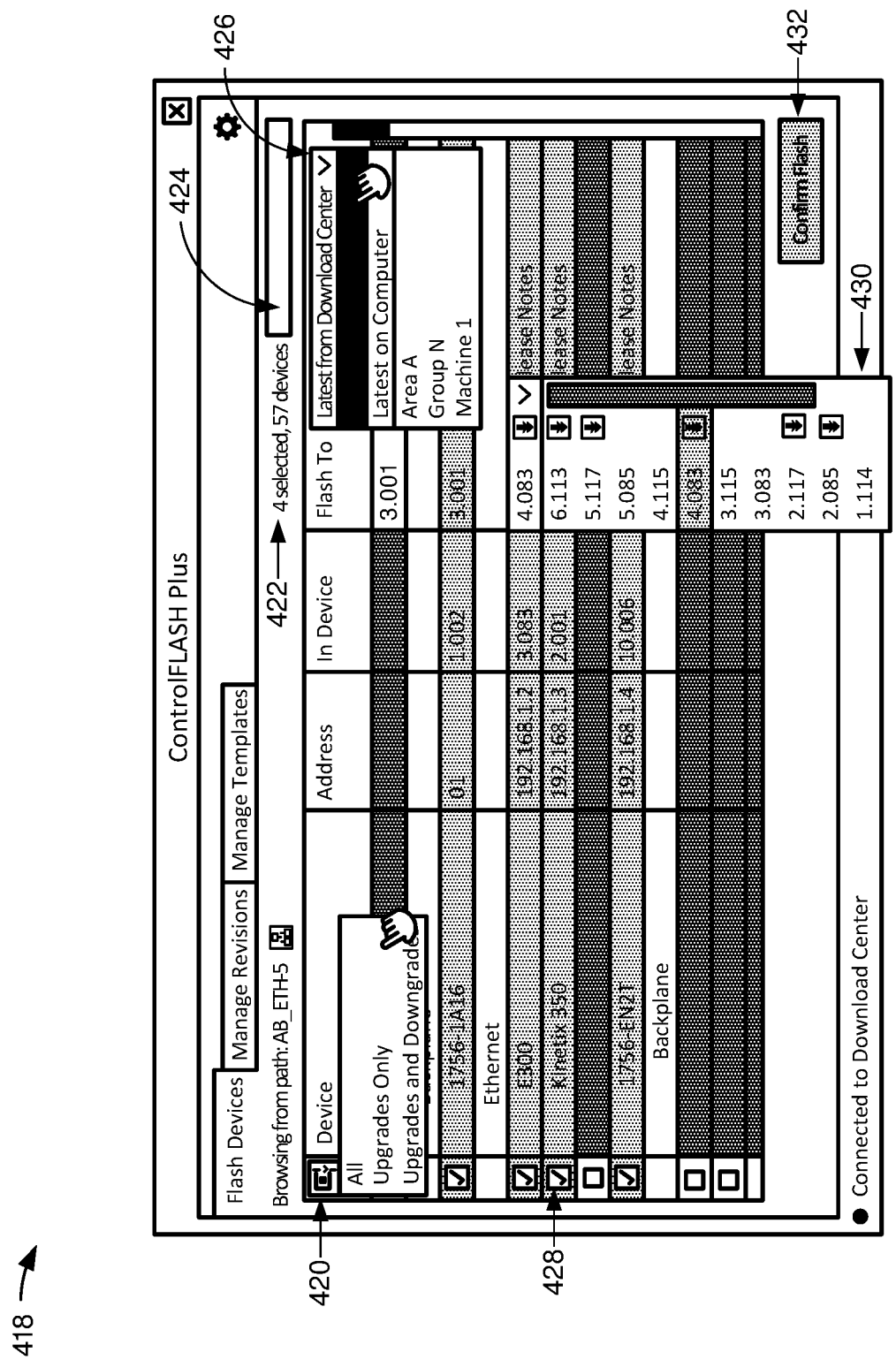

FIG. 4C illustrates additional aspects of an exemplary user interface 418 titled "ControlFLASH Plus: Flash Devices" which is configured to update machine firmware within an industrial automation environment comprising a plurality of industrial components, such as industrial automation system 100 from FIG. 1.

The selection accelerator 420 affects which devices in the list are selected. All selects all, Upgrades Only selects all devices for which the selected Flash To revision is greater than the In Device revision. Upgrades and Downgrades selects all devices for which the Flash To revision and the In Device revision are different.

Text 422 indicates how many devices are in the list and how many are selected. If there are no devices selected, only the number of devices is shown ("0 selected" isn't displayed).

Filter Control 424 allows the user to filter the list by device. The Flash To accelerator 426 affects the selected revisions in the Flash To revision dropdowns. Latest from Download Center is the default selection if there is a connection to the product compatibility and download center 110, otherwise it does not appear at all and Latest on Computer is the default. Templates are listed below the line.

When a user clicks a checkbox 428 the device toggles between selected and unselected. When selected, the box is checked and the device line is highlighted. All devices are unselected by default when the application is opened or when a new path is selected.

Revision Dropdown 430 contains all the revisions available on the computer or from the product compatibility and download center 110 (if connected). If a revision is not currently on the computer, the download icon is displayed next to it in the list, and remains if the revision is selected. When a revision is selected using the dropdown, the device becomes selected. The Confirm Flash 432 button is disabled if no devices are selected. It is enabled when at least one device is selected.

Figure 4D:
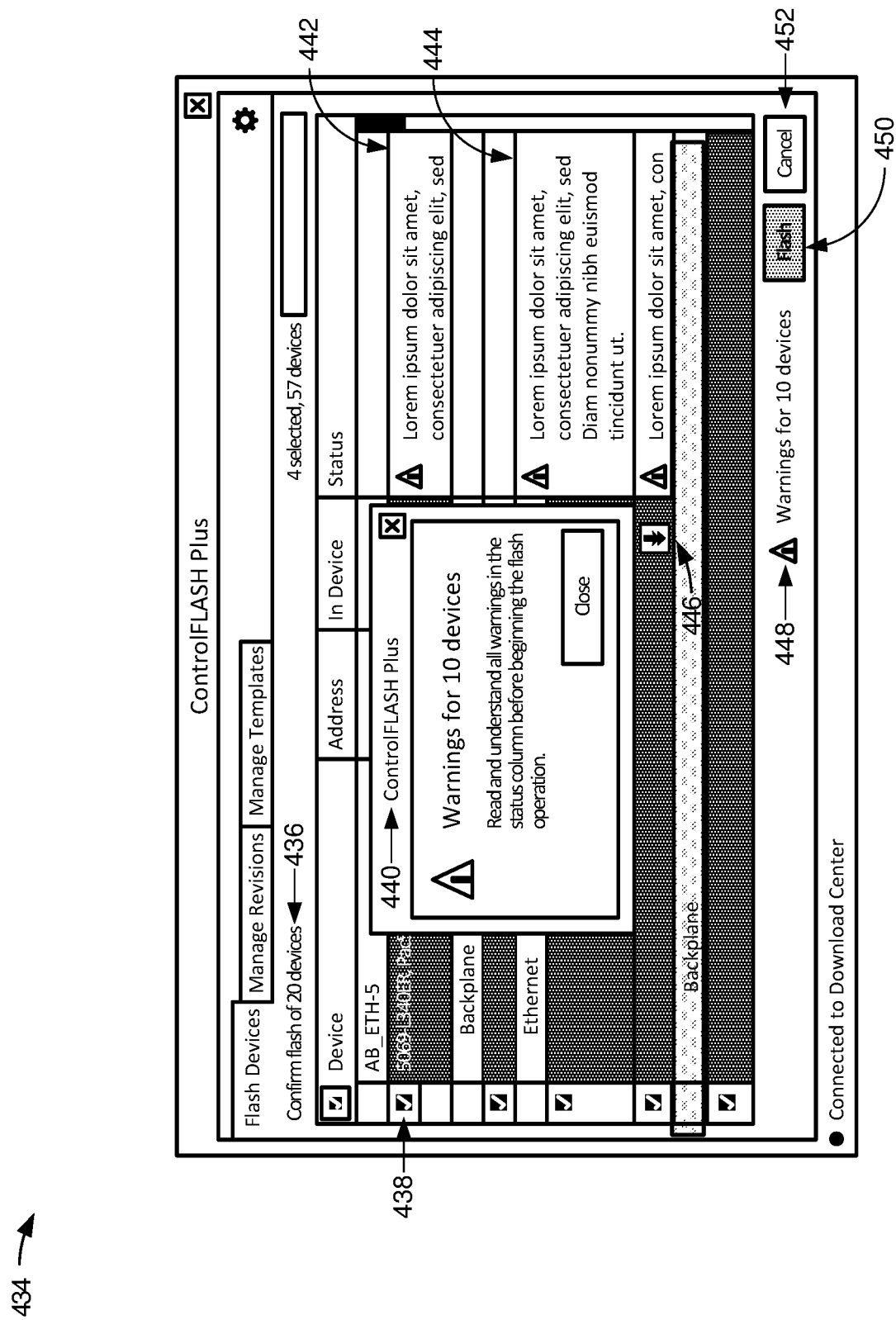

FIG. 4D illustrates additional aspects of an exemplary user interface 434 titled "ControlFLASH Plus: Flash Devices" which is configured to update machine firmware within an industrial automation environment comprising a plurality of industrial components, such as industrial automation system 100 from FIG. 1.

When the user selects the Confirm Flash button they will be presented with user interface 434. The message 436 "Confirm flash of X devices" appears above the table at the left. Checkboxes 438 remain enabled for all devices. If there are warnings for any devices, a warning message 440 appears indicating the number of devices with warnings and instructing the user to read all warnings before updating.

Warning messages 442 and 444 appear in the Status column with a warning icon to the left and the text of the warning to the right. If a message is longer than 5 lines, it is truncated with an ellipsis. In this case, a down caret appears in the bottom right of the cell which expands the cell.

Download arrows 446 remain visible. A warning icon 448 and the number of devices with warnings appears to the left of the Flash button 450. The Flash button 450 appears to the left of the Cancel button 452 and has focus by default. When this button 450 is selected the view changes to In Progress, and the product compatibility and download center 110 end user license agreement may appear. The Cancel button 452 is to the right of the Flash button 450. If the user selects this button, they are returned to the Selection view 402.

Figure 4E:
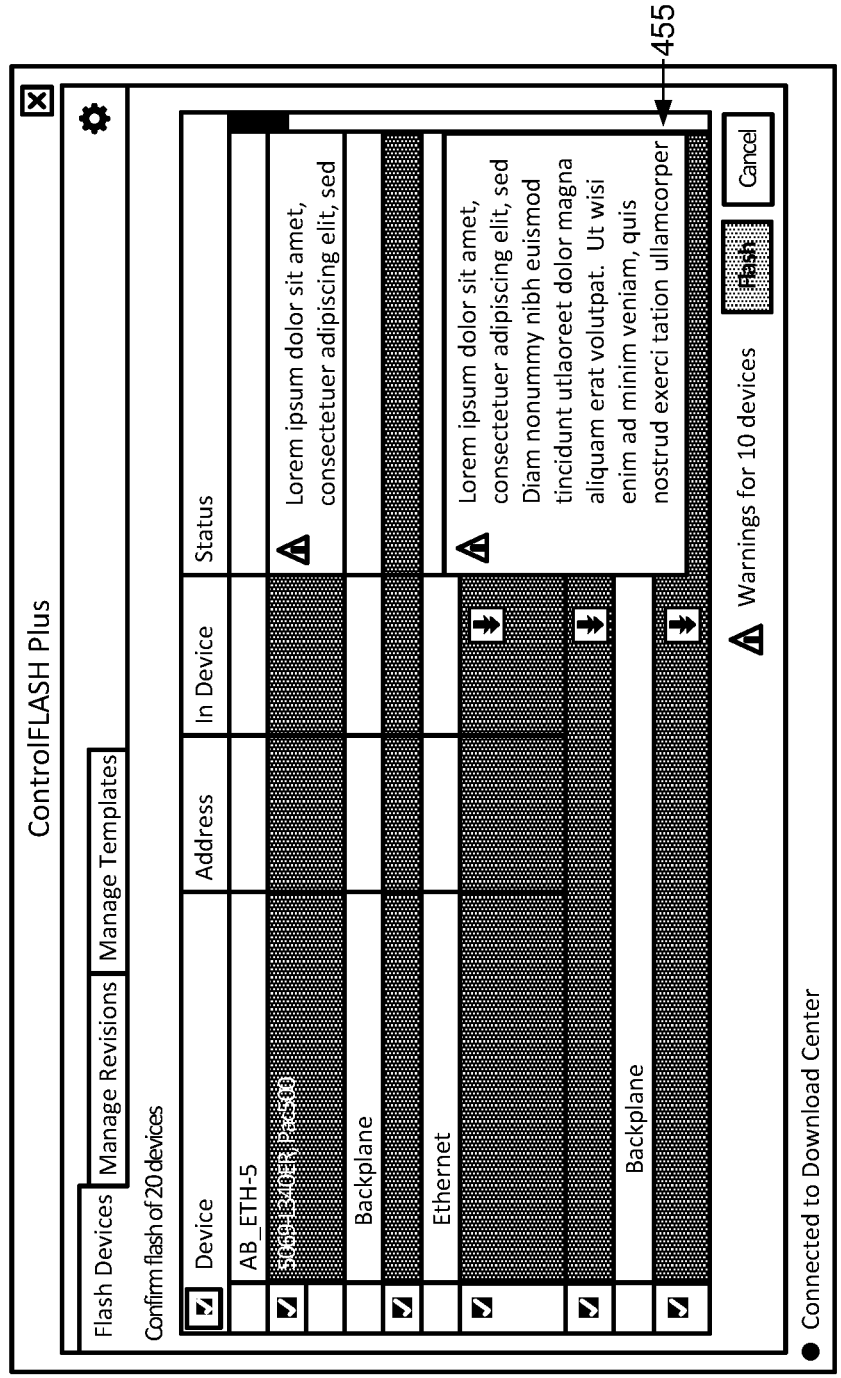

FIG. 4E illustrates additional aspects of an exemplary user interface 454 titled "ControlFLASH Plus: Flash Devices" which is configured to update machine firmware within an industrial automation environment comprising a plurality of industrial components, such as industrial automation system 100 from FIG. 1.

When a warning message is expanded the full message 455 appears. The stroke around the expanded cell is black and an up caret takes the place of the down caret to collapse the cell.

Figure 4F:
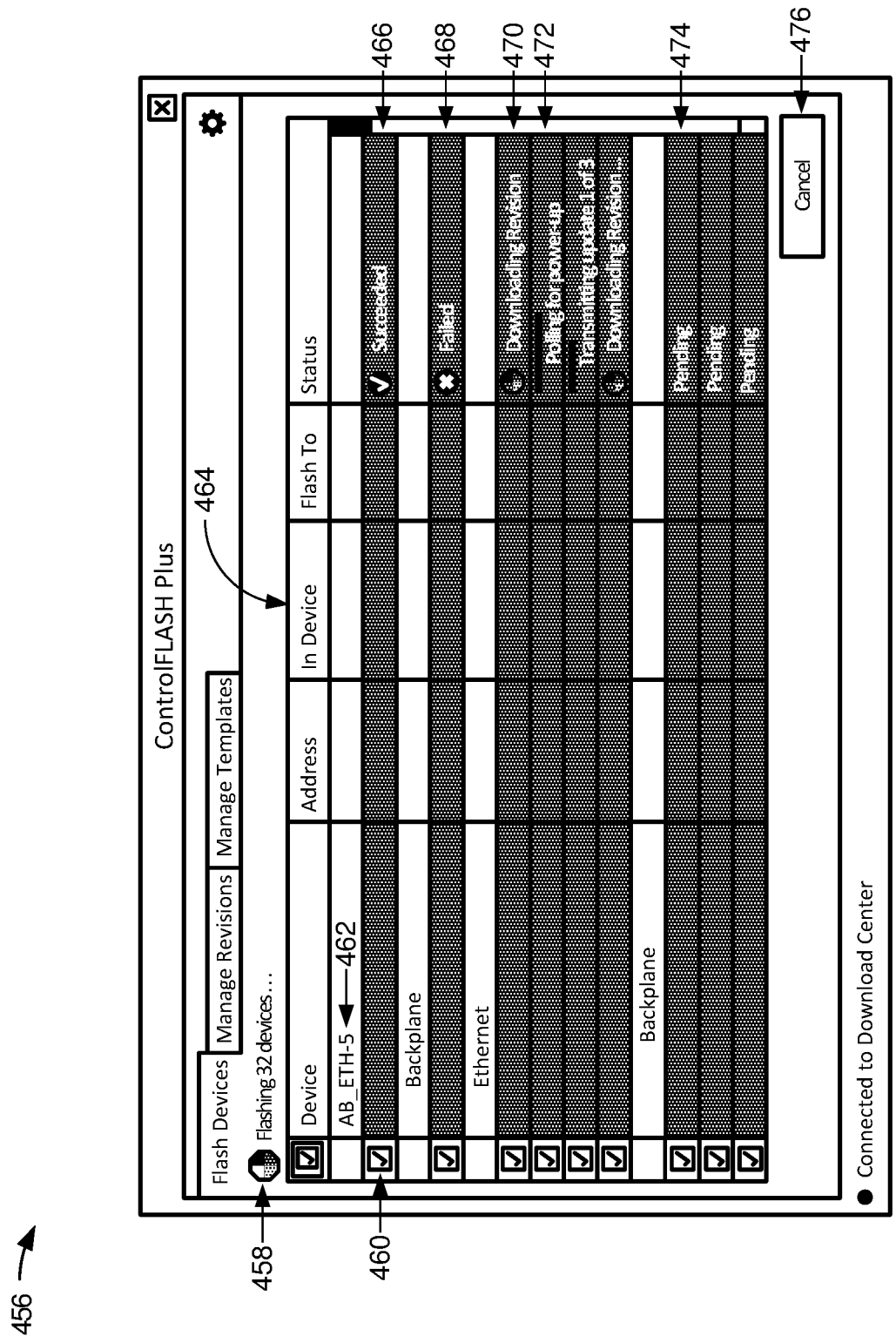

FIG. 4F illustrates additional aspects of an exemplary user interface 456 titled "ControlFLASH Plus: Flash Devices" which is configured to update machine firmware within an industrial automation environment comprising a plurality of industrial components, such as industrial automation system 100 from FIG. 1.

During the firmware update operation a spinner 458 appears above the table next to the text "Flashing X devices . . . " All checkboxes 460 appear as checked and disabled, as does the selection accelerator. Only devices 462 that are selected for firmware updates are shown in the list during the firmware update operation. As in filtering, devices that contribute to the topology but were not selected to be updated are displayed in lighter text. The contents of the Address column are also displayed in lighter text, while the rest of the columns are left blank.

When a device is successfully updated, the value in the In Device column 464 changes to the new revision. The success icon and the text "Succeeded" 466 are displayed in the status column when a device is successfully updated.

The failure icon and the text "Failed" 468 are displayed in the status column when a device doesn't update successfully.

The reason for the failure and a recommendation for fixing the issue follow. These strings come from error code lookup aided by the use of a firmware kit file containing all possible error codes. Hovering over this cell provides a tooltip with the full message.

A spinner 470 indicates that a revision is being downloaded from the product compatibility and download center 110. During firmware update operation, a progress bar 472 indicates relative progress with status text beneath. When a device is waiting to be updated, its status text is "Pending" 474.

Cancel button 476 allows the user to cancel any pending firmware updates, but does not stop firmware updates that have already begun. Clicking the Cancel button 476 triggers a confirmation dialog with the message "Cancel all pending flash operations?" and Yes and No buttons. Once confirmed, the Cancel button 476 appears disabled.

Figure 4G:
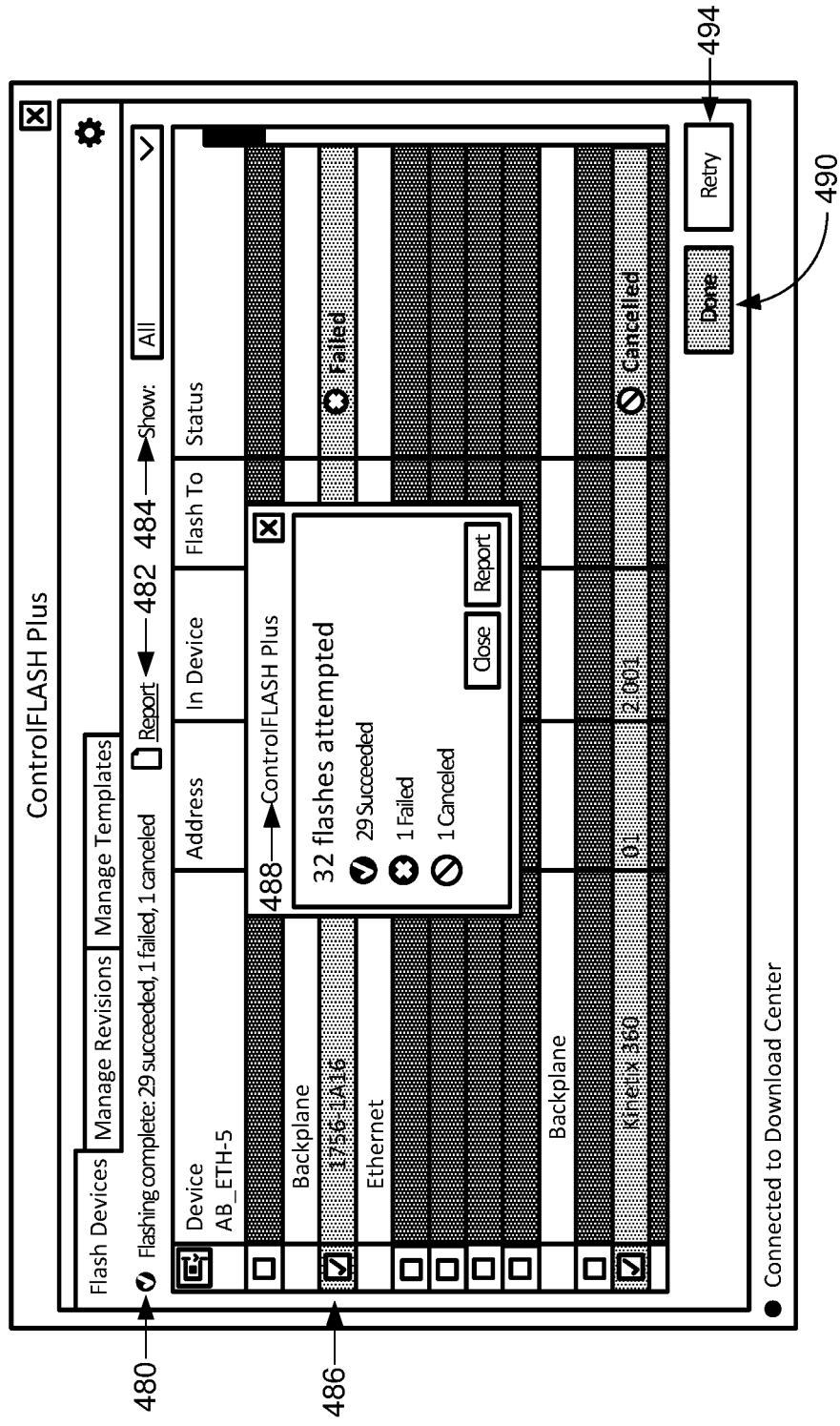

FIG. 4G illustrates additional aspects of an exemplary user interface 478 titled "ControlFLASH Plus: Flash Devices" which is configured to update machine firmware within an industrial automation environment comprising a plurality of industrial components, such as industrial automation system 100 from FIG. 1.

When the firmware updating operation is complete (all devices have either succeeded, failed, or been canceled) the completed icon 480 appears above the table followed by text that indicates the number of succeeded, failed, and canceled device flashes.

The report button 482 launches a file summarizing the outcome of the firmware update operation. This file is in comma-separated value (CSV) format; the operating system will determine which program should be used, and saving is handled by that program. The file includes the name of the logged-in FT Security user and their location (computer name), as well as the following for each device updated: success or failure status, catalog number and device name, device serial number, path to the device (including the driver name), original revision, new revision (or attempted revision), the script file path (directory path to the firmware kit file containing firmware update instructions), and the time and date that each operation finished.

The Show dropdown 484 allows the user to filter the device list based on firmware update results. The dropdown list contains the options: All, Succeeded, Failed, and Canceled. Once the firmware update operation is complete, the selection checkboxes 486 are enabled for all devices. If a firmware update failed or was canceled, the device is selected in the Results view. This accelerates the Retry workflow.

When the firmware update operation completes, a dialog 488 pops up that reports the results. The dialog buttons are Close and Report. Each status, succeeded, failed, or canceled, is only displayed if there is at least one device in that category. (E.g., "0 Failed" isn't displayed.)

The Done button 490 returns the user to the initial view 202 in the Flash Devices workflow. The Retry button 494 begins a new firmware update operation for all currently selected devices. This operation functions exactly as the initial operation did.

FIGS. 5A-5C illustrate an exemplary user interface for managing revisions within an update process for updating firmware within an industrial automation environment.

FIG. 5A illustrates an exemplary user interface 500 titled "ControlFLASH Plus: Manage Revisions" which is configured to manage revisions of machine firmware within an industrial automation environment comprising a plurality of industrial components, such as industrial automation system 100 from FIG. 1.

FIG. 5B illustrates additional aspects of an exemplary user interface 502 titled "ControlFLASH Plus: Manage Revisions" which is configured to manage revisions of machine firmware within an industrial automation environment comprising a plurality of industrial components, such as industrial automation system 100 from FIG. 1.

The Manage Revisions tab 503 shows all revisions located in any of the user's monitored folders. The user can manage monitored folders in the a settings dialog. If there is a connection to the product compatibility and download center 110, the Add Device Revisions button 504 launches the Add Device Revisions Dialog. If there is no connection to the product compatibility and download center 110, the Add Device Revisions button 504 does not appear.

Just like the device filter in the firmware update workflow, control 506 filters against data in the device column. If there are no filter results in the Manage Revisions view 502, the text "No matching device revisions." appears.

If there is a connection to the product compatibility and download center 110 and there are more revisions for a device than those the user has downloaded, the Add icon 508 appears in the Device cell. If every revision for a device is already on the computer, or there is no connection to the product compatibility and download center 110, the icon doesn't appear. Clicking the icon launches the Add Device Revision dialog with the search field pre-populated with the device name and the results already displayed.

The Folder column 510 displays a link to the file location of each revision. A tooltip displays the full path on hover. The trash icon 512 allows the user to delete each revision. Clicking the icon 512 triggers a confirmation dialog. The revisions in this table 514 are aligned on the decimal point.

Release notes 516 should be stored locally for all revisions that the user has downloaded, ensuring that users have access to these documents even when disconnected from the product compatibility and download center 110.

FIG. 5C illustrates additional aspects of an exemplary user interface 518 titled "ControlFLASH Plus: Manage Revisions" which is configured to manage revisions of machine firmware within an industrial automation environment comprising a plurality of industrial components, such as industrial automation system 100 from FIG. 1.

Revisions 520 being downloaded appear in the Manage Revisions list immediately when the Add Device Revisions dialog closes. While the revision is downloading, a spinner 522 is displayed in the Folder column. When the download completes, the file path and trash can icon appear. The Exit warning dialog 524 appears if the user attempts to close the application during download.

FIGS. 6A-6C illustrate an exemplary user interface for managing templates within an update process for updating firmware within an industrial automation environment.

FIG. 6A illustrates an exemplary user interface 600 titled "ControlFLASH Plus: Manage Templates" which is configured to manage templates for updating machine firmware within an industrial automation environment comprising a plurality of industrial components, such as industrial automation system 100 from FIG. 1.

FIG. 6B illustrates additional aspects of an exemplary user interface 602 titled "ControlFLASH Plus: Manage Templates" which is configured to manage templates for updating machine firmware within an industrial automation environment comprising a plurality of industrial components, such as industrial automation system 100 from FIG. 1.

The Manage Templates tab 603 is where users create and make changes to templates. Templates are used in the Flash Devices workflow from the Flash To dropdown. The Import button 604 allows the user to bring in templates from a saved file. Clicking the button 604 launches the system file browser. If a template is imported with the same name as an existing template, the imported template is named [Template Name](1).

The Export All button 606 allows the user to create a file containing all of their templates. Clicking the button 606 launches the system file browser so the user can name and save the file. The New Template text input box 608 allows the user to create a new template by typing its name and pressing enter. The new template is created and selected. The Add Devices dialog opens automatically.

The Add Devices button 610 opens the Add Devices dialog for the selected template. The Copy button 612 creates a duplicate of the selected template named "[Original Name]copy". When the user creates a copy it immediately becomes the selected template. The Export button 614 allows the user to create a file containing the selected template. Clicking the button 614 launches the system file browser so the user can name and save the file. The file should be human readable to allow external editing.

The Delete button 616 deletes the selected template. The button 616 triggers a confirmation dialog reading "Delete [Template Name]?" with Delete and Don't Delete buttons. The user can select a template by clicking its name 618.

FIG. 6C illustrates additional aspects of an exemplary user interface 620 titled "Add Devices" which is configured to manage templates for updating machine firmware within an industrial automation environment comprising a plurality of industrial components, such as industrial automation system 100 from FIG. 1.

The user may enter text into the search field 622 to populate the Add Devices 620 list. As with the filter controls on other screens, search results appear as the user types. This matches the functionality of the product compatibility and download center 110 website.

Devices that aren't already in the template can be selected using their checkbox 624. The user can change the preferred revision using the revision dropdown. Devices that are already in the template are disabled, along with their revision dropdown. Release notes and PSA links do not appear for disabled devices.

When one or more devices are selected, the View selected devices link 626 appears with the number of selected devices in parentheses. Clicking this link changes the view to show only the selected revisions. The Add button 628 closes the dialog and adds all the selected devices to the template. The Cancel button 629 closes the dialog without adding any selected devices to the template.

Since the product compatibility and download center 110 stores many of the files used in the method described herein for updating machine firmware within an industrial automation environment, when the connection to the product compatibility and download center 110 is lost, user interface screens must reflect that situation. FIGS. 7A-7C illustrate exemplary user interfaces when the connection to the product compatibility and download center 110 is down.

FIG. 7A illustrates aspects of an exemplary user interface 700 titled "ControlFLASH Plus: Flash Devices" which is configured to manage templates for updating machine firmware within an industrial automation environment comprising a plurality of industrial components, such as industrial automation system 100 from FIG. 1, when there is no connection to the product compatibility and download center 110.

If the connection to the product compatibility and download center 110 is lost when the Latest from Download Center option 702 is selected in the Flash To dropdown, the option remains selected but the red disconnected icon appears to the right. The Latest from Download Center option 702 is removed from the open dropdown list.

If the connection to the product compatibility and download center 110 is lost when a revision from the product compatibility and download center 110 is selected for a given device, it remains selected, but the download icon is replaced with a red disconnected icon. All revisions from the product compatibility and download center 110 are removed from the open dropdown list 704, including the one that's selected.

Release notes 706 and PSA links will only appear if they can be accessed locally. Indicator 708 indicates that there's no connection to the product compatibility and download center 110 and why, if the reason can be determined.

FIG. 7B illustrates additional aspects of an exemplary user interface 710 titled "ControlFLASH Plus: Manage Revisions" which is configured to manage templates for updating machine firmware within an industrial automation environment comprising a plurality of industrial components, such as industrial automation system 100 from FIG. 1, when there is no connection to the product compatibility and download center 110.

The Add Device Revisions button 712 does not appear when there's no connection to the product compatibility and download center 110. Add buttons do not appear within the table 714 when there's no connection to the product compatibility and download center 110. Release notes 716 and PSA links only appear if they can be accessed locally.

FIG. 7C illustrates additional aspects of an exemplary user interface 718 titled "ControlFLASH Plus: Manage Templates" which is configured to manage templates for updating machine firmware within an industrial automation environment comprising a plurality of industrial components, such as industrial automation system 100 from FIG. 1, when the connection to the product compatibility and download center 110 is down.

The Add Devices button 720 still appears when there's no connection to the product compatibility and download center 110. The Add Device list will only be populated with local information. Release notes and PSA links still appear as these documents should be saved locally. If a release note file is not available locally, the link will be disabled.

Figure 8:
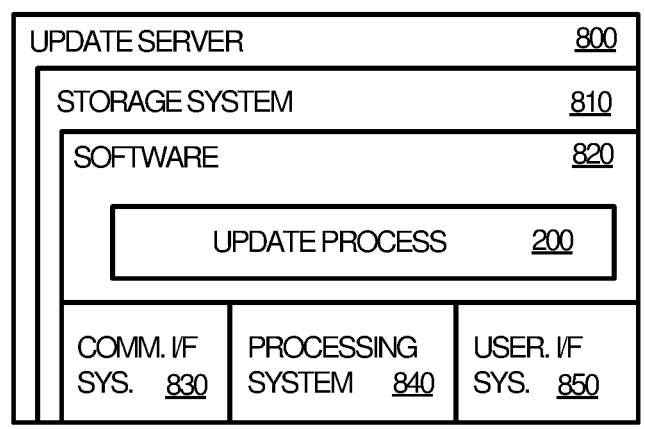
FIG. 8 illustrates an exemplary update server or customer device within an industrial automation system.

FIG. 8 illustrates an exemplary update server 800, such as update server 120 from FIG. 1, or an exemplary customer device 800, such as customer environment 104 from Figure, within an industrial automation system, such as industrial automation system 100 from FIG. 1.

Update server or customer device 800 includes user interface system 850, communication interface system 830, processing system 840, and storage system 810. Storage system 810 in the example shown includes software 820. In some examples, software 820 comprises update process 200 that configures the update server or customer device 800, when executed by the update server or customer device 800 in general or processing system 840 in particular, to direct update server or customer device 800 to perform industrial automation operations, such as configuring and performing firmware updates as illustrated in FIG. 2. Other data, such as configuration data and context data, is also stored in storage system 810. Configuration data may include firmware templates as described herein.

Processing system 840 may comprise a microprocessor and other circuitry that retrieves and executes software 820 from storage system 810. Processing system 840 may be implemented within a single processing device, but may also be distributed across multiple processing devices or subsystems that cooperate in executing program instructions. Examples of processing system 840 include general purpose central processing units, application specific processors, and logic devices, as well as any other type of processing device, combinations, or variations.

Storage system 810 may comprise any computer readable storage media readable by processing system 840 and capable of storing software 820. Storage system 810 may include volatile and nonvolatile, removable and non-removable media implemented in any method or technology for storage of information, such as computer readable instructions, data structures, program modules, or other data. Storage system 810 may be independent from or integrated into processing system 840. Storage system 810 can comprise additional elements, such as a memory controller, capable of communicating with processing system 840. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 810 may also include communication media over which software 820 may be communicated internally or externally. Storage system 810 may be implemented as a single storage device but may also be implemented across multiple storage devices or sub-systems co-located or distributed relative to each other. Storage system 810 may comprise additional elements capable of communicating with processing system 840 or possibly other systems.

Software 820 may be implemented in program instructions and among other functions and may, when executed by processing system 840, direct processing system 840 to operate as described herein. In particular, the program instructions may include various components or modules that cooperate or otherwise interact to implement at least a portion of update server or customer device 800. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 820 in the examples comprises computer programs, firmware, or some other form of machine-readable processing instructions. Software 820 may include an operating system, utilities, drivers, network interfaces, applications, virtual machines, or some other type of software. Software 820 may include additional processes, programs, or components, such as operating system software or other application software. Software 820 may also comprise firmware or some other form of machine-readable processing instructions executable by processing system 840.

In general, software 820, when loaded into processing system 840 and executed, may transform a suitable apparatus, system, or device from a general-purpose computing system into a special-purpose computing system customized to assist in updating industrial automation controller firmware, among other operations. Indeed, encoding software 820 on storage system 710 may transform the physical structure of storage system 810. The specific transformation of the physical structure may depend on various factors in different implementations of this description. Examples of such factors may include, but are not limited to the technology used to implement the storage media of storage system 810 and whether the computer-storage media are characterized as primary or secondary storage, as well as other factors.

User interface system 850 may include communication connections and devices that allow for communication with users over a communication network or collection of networks. User interface system 850 may include user input and output devices for being controlled by a user, or these devices may be external to update server or customer device 700.

User interface system 850 may comprise a network card, network interface, port, or interface circuitry that allows update server or customer device 800 to communicate over a network or networks. User interface system 850 may also include a memory device, software, processing circuitry, or some other device. User interface system 850 can use any suitable communication protocol to exchange communications with a user.

User interface system 850 may include components that communicate over communication links, such as network cards, ports, RF transceivers, processing circuitry and software, or other communication components. User interface system 850 may be configured to communicate over electrically conductive, wireless, optical, or other links.

User interface system 850 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Communication interface system 830 may include communication connections and devices that allow for communication with computers, such as product compatibility and download center 110, over a communication network or collection of networks.

Communication interface system 830 may comprise a network card, network interface, port, or interface circuitry that allows update server or customer device 800 to communicate over a network or networks. Communication interface system 830 may also include a memory device, software, processing circuitry, or some other device. Communication interface system 830 can use any suitable communication protocol to exchange communications with another computer.

Communication interface system 830 may include components that communicate over communication links, such as network cards, ports, RF transceivers, processing circuitry and software, or other communication components. Communication interface system 830 may be configured to communicate over electrically conductive, wireless, optical, or other links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for updating firmware within an industrial automation environment comprising a plurality of industrial components, the method comprising:
   receiving, by a system comprising a processor, an update configuration template comprising update specifications corresponding to the industrial automation environment through a web interface within an application running on a user device, wherein the update specifications include at least one specification from the group of: a firmware version offset, a relative firmware version offset, and a do not update device specification;
   providing, by the system, an industrial system firmware update menu from an update server to a user through the web interface within the application running on the user device;
   receiving, by the system, one or more selections of the industrial system firmware update menu from the user through the web interface within the application running on the user device;
   determining, by the system, required firmware update files and a firmware update schedule based on the update configuration template and the one or more selections of the industrial system firmware update menu; and
   transferring, by the system, the required firmware update files to the industrial components in an order specified by the firmware update schedule.

2. The method of claim 1, further comprising:
   receiving compatibility data for devices relating to the one or more selections of the industrial system firmware update menu from a product compatibility and download center; and
   providing the compatibility data to the user through the web interface within the application running on the user device.

3. The method of claim 2, further comprising:
   determining the required firmware update files and the firmware update schedule based on the compatibility data.

4. The method of claim 1, further comprising:
   receiving lifecycle data for devices relating to the one or more selections of the industrial system firmware update menu from a product compatibility and download center; and
   providing the lifecycle data to the user through the web interface within the application running on the user device.

5. The method of claim 1, wherein the application running on the user device is a mobile application.

6. The method of claim 1, further comprising:
   providing release notes to the user through the web interface within the application running on the user device for at least one device related to the one or more selections of the industrial system firmware update menu.

7. One or more non-transitory computer-readable media having stored thereon program instructions to facilitate updating firmware within an industrial automation environment comprising a plurality of industrial components, wherein the program instructions, when executed by a computing system, direct the computing system to at least:
   receive an update configuration template comprising update specifications corresponding to the industrial automation environment through a web interface within an application running on a user device, wherein the update specifications include at least one specification from the group of: a firmware version offset, a relative firmware version offset, and a do not update device specification;
   provide an industrial system firmware update menu from an update server to a user through the web interface within the application running on the user device;
   receive one or more selections of the industrial system firmware update menu through the web interface within the application running on the user device;
   determine required firmware update files and a firmware update schedule based on the update configuration template and the one or more selections of the industrial system firmware update menu; and
   transfer the required firmware update files to the industrial components in an order specified by the firmware update schedule.

8. The one or more non-transitory computer-readable media of claim 7, further comprising program instructions, which when executed by the computing system, direct the computing system to at least:
   receive compatibility data for devices relating to the one or more selections of the industrial system firmware update menu from a product compatibility and download center; and
   provide the compatibility data to the user through the web interface within the application running on the user device.

9. The one or more non-transitory computer-readable media of claim 8, further comprising program instructions, which when executed by the computing system, direct the computing system to at least:
   determine the required firmware update files and the firmware update schedule based on the compatibility data.

10. The one or more non-transitory computer-readable media of claim 7, further comprising program instructions, which when executed by the computing system, direct the computing system to at least:
    receive lifecycle data for devices relating to the one or more selections of the industrial system firmware update menu from a product compatibility and download center; and
    provide the lifecycle data to the user through the web interface within the application running on the user device.

11. The one or more non-transitory computer-readable media of claim 7, wherein the application running on the user device is a mobile application.

12. The one or more non-transitory computer-readable media of claim 7, further comprising program instructions, which when executed by the computing system, direct the computing system to at least:
    provide release notes to the user through the web interface within the application running on the user device for at least one device related to the one or more selections of the industrial system firmware update menu.

13. A computer system for updating firmware within an industrial automation environment comprising a plurality of industrial components, the computer system comprising:
    a machine interface coupled with the plurality of industrial components, configured to transfer firmware updates to the plurality of industrial components;
    a user interface configured to receive inputs and to display information;

a hardware memory storing data corresponding to the industrial automation environment; and a processor coupled with the machine interface, the user interface, and the hardware memory, configured to:

receive an update configuration template comprising update specifications corresponding to the industrial automation environment through a web interface within an application running on a user device, wherein the update specifications include at least one specification from the group of: a firmware version offset, a relative firmware version offset, and a do not update device specification;

provide an industrial system firmware update menu from an update server to a user through the web interface within the application running on the user device;

receive one or more selections of the industrial system firmware update menu through the web interface within the application running on the user device;

determine required firmware update files and a firmware update schedule based on the update configuration template and the one or more selections of the industrial system firmware update menu; and transfer the required firmware update files to the industrial components in an order specified by the firmware update schedule.

14. The computer system of claim 13, wherein the processor is further configured to:

receive compatibility data for devices relating to the one or more selections of the industrial system firmware update menu from a product compatibility and download center; and provide the compatibility data to the user through the web interface within the application running on the user device.

15. The computer system of claim 14, wherein the processor is further configured to:

determine the required firmware update files and the firmware update schedule based on the compatibility data and the one or more selections of the industrial system firmware update menu.

16. The computer system of claim 13, wherein the processor is further configured to:

receive lifecycle data for devices relating to the one or more selections of the industrial system firmware update menu from a product compatibility and download center; and provide the lifecycle data to the user through the web interface within the application running on the user device.

17. The computer system of claim 13, wherein the application running on the user device is a mobile application.

* * * * *